Dec. 9, 1952        B. H. THURMAN        2,621,196
METHOD OF DEODORIZING GLYCERIDE OILS
Filed Oct. 28, 1948        4 Sheets-Sheet 1
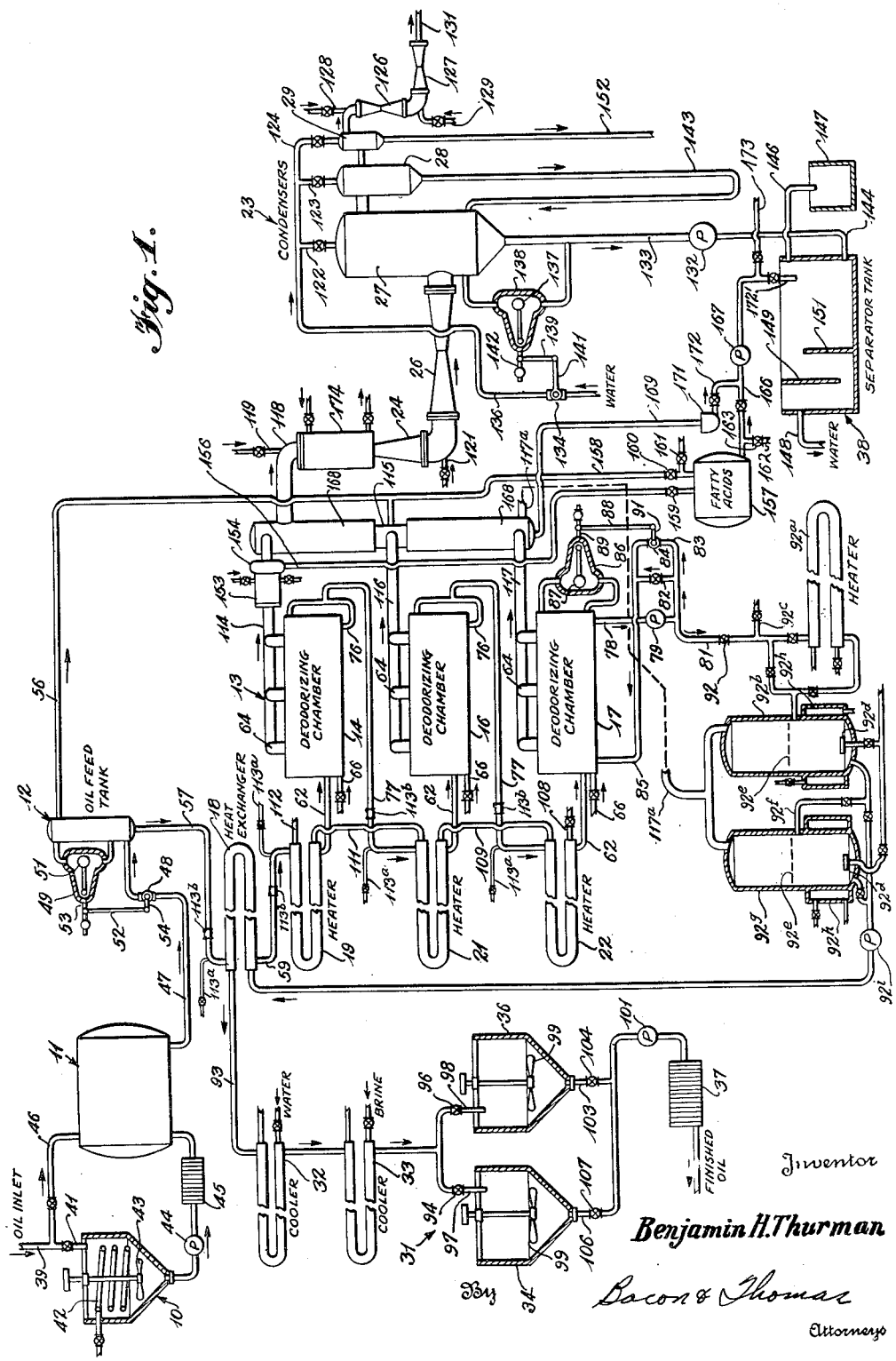
Inventor
Benjamin H. Thurman
By Bacon & Thomas
Attorneys

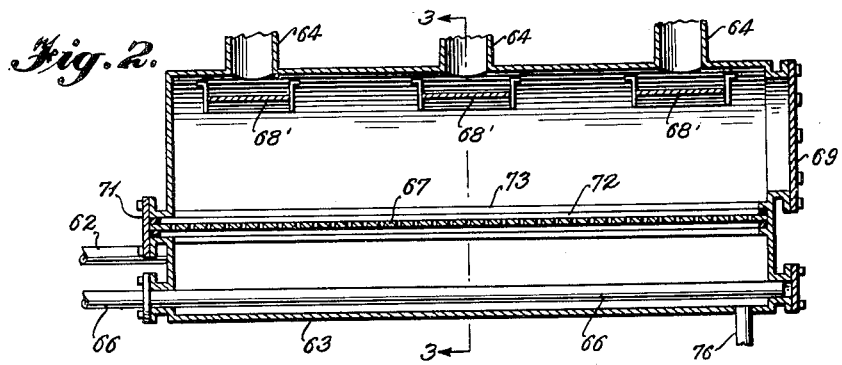
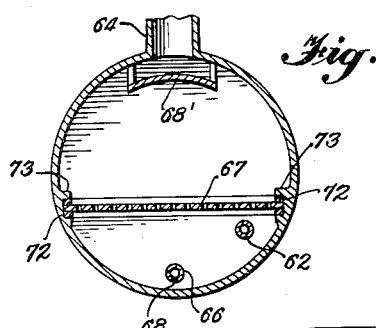
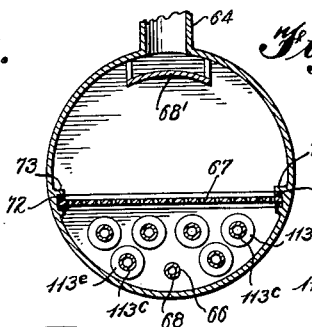
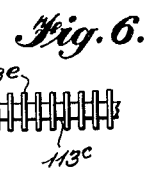
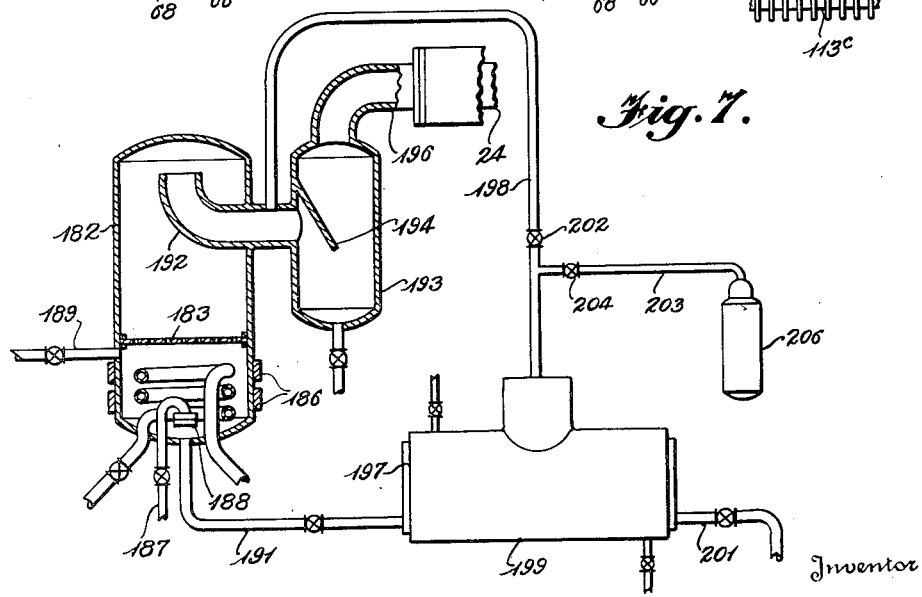
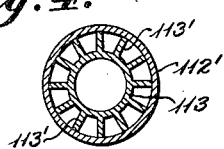

Dec. 9, 1952   B. H. THURMAN   2,621,196
METHOD OF DEODORIZING GLYCERIDE OILS
Filed Oct. 28, 1948   4 Sheets-Sheet 4
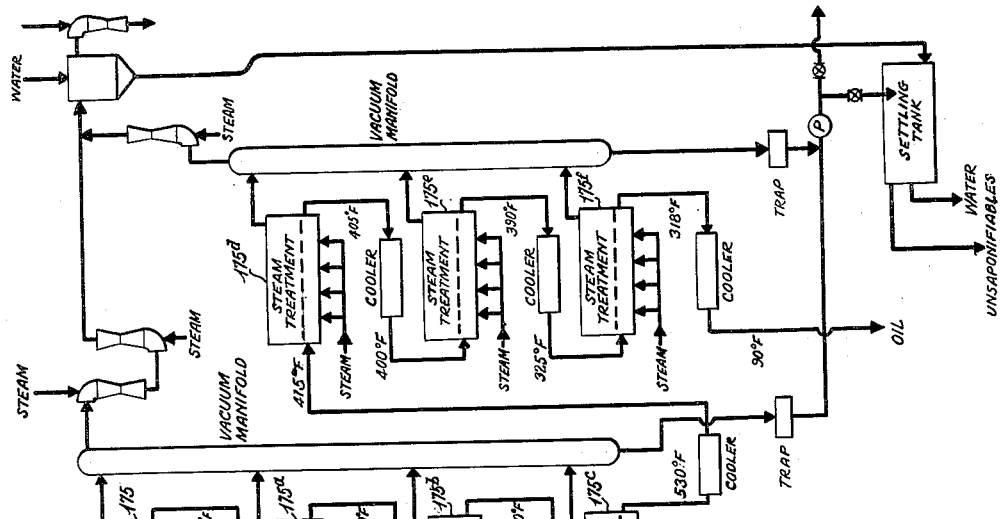
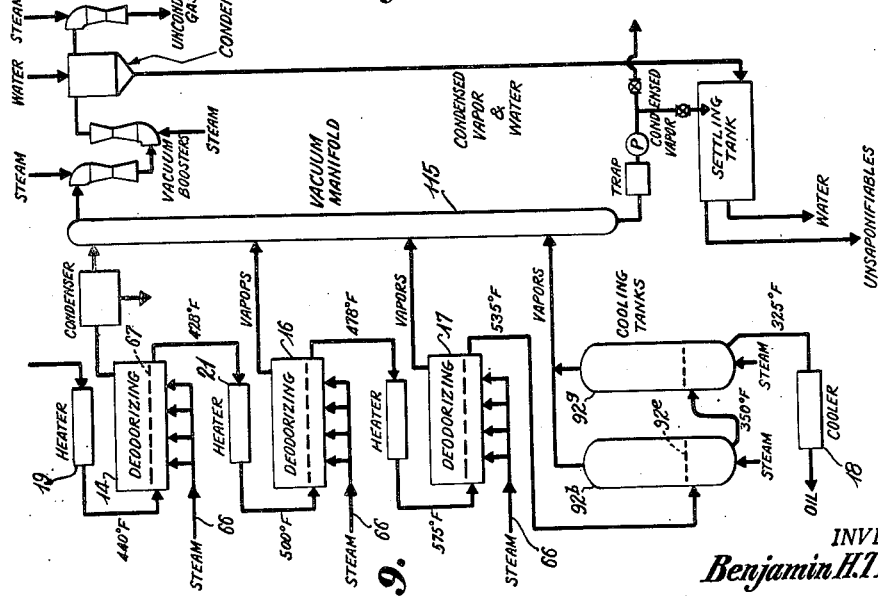
INVENTOR.
Benjamin H. Thurman
BY Bacon & Thomas
ATTORNEYS Patented Dec. 9, 1952

2,621,196

UNITED STATES PATENT OFFICE 2,621,196

METHOD OF DEODORIZING GLYCERIDE OILS

Benjamin H. Thurman, New York, N. Y., assignor to Kraft Foods Company, Chicago, Ill., a corporation of Delaware Application October 28, 1948, Serial No. 57,114

54 Claims. (Cl. 260—428)

This invention relates to the purification of oil, and more particularly, to a process for deodorizing edible glyceride oils to produce improved oils and recover from the oil by vaporization and condensation a concentrate of valuable products. The invention has particular utility for the treatment of highly unsaturated non-conjugated glyceride oils of the reverting type, such as soya bean oil, since it produces edible oils which are stable against both rancidity and reversion and at the same time recovers from the oil the valuable products referred to above.

It also has utility for the treatment of edible oils, which are commercially considered to be relatively non-reverting, such as cottonseed, corn oil, peanut oil, sunflower seed oil and sesame seed oil, both by reason of the fact that it makes possible the rapid and continuous deodorization of such oils and by reason of the valuable products recovered from the oil even though such oils may be satisfactorily deodorized by prior processes. Certain glyceride oils which are highly conjugated and which rapidly polymerize, for example, tung oil, are not suitable for treatment by the present process, but such oils are not classed as edible oils. In general, the present process can be advantageously employed for the treatment of substantially all glyceride oils recognized as edible oils, including animal and fish oils, either by reason of the improved oil produced, or the valuable products separated from the oil and recovered, or both.

The present invention is primarily concerned with, although it is not limited to, the treatment of glyceride oils which have been previously refined, for example, by alkali refining, to remove most of the impurities contained therein. After alkali refining, such oils contain only a very small amount of residual impurities, usually not greater than about 1.0 to 1.3%, but these residual impurities include most, if not all, of the materials which produce the characteristic odor and taste of a particular oil. Most of the residual impurities are materials classifiable as unsaponifiables, and there is usually a small amount of free fatty acids. As an example, the residual impurities in soya bean oil include coloring matter, tocopherols and sterols, as well as various other complex compounds many of which have not been identified.

Most of the coloring matter can be removed from even highly colored glyceride oils by treatment with an adsorbent such as fuller's earth, activated clay, or activated charcoal. Even an extremely dark oil, such as cottonseed oil, may usually be brought to a light yellow color by this procedure. Treatment of oil with the conventional oil adsorbents noted above does not, however, remove the materials which impart the characteristic taste and odor to a particular oil, and it is for this reason that the deodorization of glyceride oils which are to be used for food purposes has been considered essential. Moreover, even after deodorization by the previously known processes, the deodorized oil may later develop objectionable odor or flavor, or both, in accordance with the phenomenon which the industry commonly designates as "reversion."

It is to be noted that the term reversion as employed in the edible oil art is not strictly accurate. This term connotates a return after deodorization to the original flavor of the oil introduced into the deodorizing process. The flavor which does develop in a reverting oil upon standing after deodorization is ordinarily not identical with the flavor of the oil introduced into the deodorizing process, and the term reversion is loosely used to mean the development after a time delay of any "off flavor" other than a rancid flavor. A reverting oil is, therefore, any oil which can be initially deodorized to a bland oil but which develops an off flavor other than a rancid flavor upon storage either as a body of oil or as a part of an edible product. The reason for the reversion of soya bean and other glyceride oils is not wholly understood.

Soya bean oil presents a particularly difficult problem with respect to the development of objectionable odor and taste by the reversion phenomenon. In fact, the lack of stability of soya bean oil, particularly with respect to reversion, after it has been subjected to prior deodorizing processes, has seriously limited its use in human foods. The present process is believed to be the first to consistently effect the deodorization and stabilization of soya bean oil so as to make it useful as a high quality human food. The present invention is, therefore, primarily directed to the treatment of soya bean oil, although any of the edible glyceride oils, including animal, fish and vegetable oils, as well as hydrogenated oils of the types mentioned, may be advantageously treated by the process of the present invention.

As previously indicated, the process of the present invention does not require that the glyceride oil being treated shall be an alkali-refined oil. It is necessary merely that the oil be sufficiently free from gums so that heat-precipitated gums do not deposit in or clog the deodorizing system. Thus, degummed oils as well as oils which are initially free from gums, such as certain types of solvent extracted oils or solvent treated oils, may be subjected to the treatment of the present invention without previous alkali refining.

One of the best known of the prior processes for deodorizing refined soya bean oil, and most other edible oils, has conventionally comprised the heating of a large batch of the oil, for example 30,000 lbs., to a relatively high temperature in a vertically extending still. Temperatures as high as 440° F. and even in extreme cases, with small batches of difficult oils, temperatures as high as 475° F., have been employed in such processes. Oil at ambient temperatures or oil heated to moderately elevated temperatures, has been introduced into the still so as to occupy approximately one-half of the volume thereof. A vacuum, within the range of from about 28 to 29 inches of mercury, has been produced in the space above the oil and the oil heated as rapidly as possible to the temperature desired by means of heating coils in the still or heating jackets around the still. Steam has been bubbled upwardly through this deep body of oil, from the lower portion thereof, to assist in vaporizing the odor and taste bodies and the oil has been held at the high temperatures during treatment with steam and under vacuum for periods of time ranging from four to ten hours, depending upon the nature of the oil and the temperatures employed. A deep body of oil has been employed primarily to prevent the violent splashing and surging of the oil which ordinarily takes place when steam is released into a shallow body of heated glyceride oil under vacuum conditions. Under these conditions vaporization of impurities is probably effected in the upper few inches only of the body of the oil, because of the increased pressure in the lower portions thereof, due to the hydrostatic head of the oil, and an extended time of treatment at high temperatures has been required to remove volatile impurities.

With most oils, it has been possible to initially produce a bland, substantially odorless and tasteless oil in such batch processes without serious modification of the glycerides of the oil. There has been, however, a considerable amount of soya bean oil which has not been capable of even initial deodorization by the prior batch process above described. With such oils, it has been found that the temperature and time of treatment necessary to remove the odor and taste bodies from the oil will seriously damage the oil before the odor and taste producing materials have been adequately removed. Thus, in treating these oils, the operators have, in general, limited the time of treatment, and the temperature of the oil during treatment, to prevent oil damage, but in so operating, they have been unable to satisfactorily deodorize the oils. In such instances the resulting oils are not marketable as edible oils and constitute a serious loss to the oil refiner.

From the above, it is not to be understood that all soya bean oils cannot be initially converted into a bland oil by prior processes. Many soya bean oils are susceptible to batch deodorizing in the sense that the oil withdrawn from the deodorizer is substantially odorless and tasteless. Nevertheless, such oils invariably exhibit the reversion phenomenon and develop an undesirable odor and taste subsequent to the deodorization process.

As noted above, the process of the present invention makes possible the deodorization of soya bean and other glyceride oils so as to produce a bland substantially odorless and tasteless oil which is substantially free from any tendency to revert at ordinary temperatures, and which has greatly increased stability against reversion at elevated temperatures. In accordance with this process, the oil is treated in stages, beginning with a relatively low temperature, followed by progressively rising temperatures in successive stages and culminating in a short time of treatment at a temperature much higher than that employed in conventional prior processes. During the process, the oil is maintained in a relatively shallow stream or pool while in intimate contact with steam and is subjected to a high vacuum. After passing through the highest temperature stage, the temperature of the oil is rapidly reduced, conveniently by stage cooling, to a determined temperature, the oil being maintained in contact with steam and being held under vacuum conditions throughout this operation. During the entire process, care is exercised to insure that no part of the oil is heated in any portion of the process materially above the average temperature of the oil in that particular part of the process. The temperatures reached in the final heating stage of the process will ordinarily range between 500 and 600° F. Because of the use of stage heating, it appears that the more volatile heat-sensitive materials which produce objectionable taste and odor are substantially completely removed or are modified before being heated to the higher temperatures necessary to remove or modify the remaining materials causing odor and taste. Thus, the total time of heat treatment of the oil at elevated temperatures can be very much shortened over prior processes. Moreover, since the more volatile impurities have been removed or modified in the prior lower temperature stages by the high vacuum employed and the effective contact with steam, the time of treatment at the high temperature may be made sufficiently short that the oil itself is not deleteriously modified, despite the high temperatures emloyed. Even oils which have been unsuccessfully deodorized in prior processes, or which are not susceptible to such deodorization, can be successfully treated by the present process so long as the glycerides constituting the main bulk of the oil have not been modified or damaged by prior treatment at too high a temperature or for too long a period of time at such high temperature.

Apparently the process of the present invention accomplishes the desired result of producing a stable, non-reverting, deodorized oil by a number of inter-related, although somewhat differing, changes in the oil under treatment. While it is generally assumed that the objectionable taste and odor which develop during the reversion of deodorized glyceride oils result from a chemical change in one of the so-called oil impurities, i. e., from a chemical change in one of the materials from the group including the sterols, the tocopherols, and other of the unsaponifiables, it is possible that some of this taste or odor may result from a change in some of the more complex glycerides constituting a part of the main bulk of the oil. The steam-distillation proces of the present invention is believed to accomplish the desired result by a straight vaporization of materials which would otherwise cause undesirable odor and taste, by a possible cracking and vaporization of such materials, and probably by polymerization of various of these materials. Whether all three occur in the treatment of any given oil, or whether other action takes place, is not fully understood, but in view of the end results, this does not appear particularly important. The pressures and temperatures used in the process are such that direct vaporization, cracking and subsequent vaporization, or polymerization of the unwanted materials can occur, and if one or more of these is necessary to remove or to modify the odor and taste producing materials, the capability is present in the process. Further, the stage operation of the process of the invention makes possible the progressive removal or modification of the materials which are volatile or reactive at lower temperatures, with resultant minimizing of the treatment time at the higher temperatures. This greatly reduces the possibility of damage to the glycerides constituting the main bulk of the oil and is, therefore, an important feature in the success of the process.

As previously pointed out, rapid cooling of the treated oil to a predetermined temperature following the high temperature distillation treatment, the oil being subjected to a high vacuum steam distillation treatment during the cooling operation, is also an important part of the process of the present invention. Apparently some cracking of small portions of the glycerides into volatile products takes place during the high temperature treatment of the oil in the last stage of the deodorization process, and these cause an unpleasant odor and taste to be developed in the oil unless treatment with steam under vacuum conditions is continued as the oil is cooled to a temperature below approximately 325° to 350° F. Thus, it is possible to either cool the highly heated oil under vacuum conditions while in intimate contact with steam, or the oil may be cooled in stages by passing the oil alternately through coolers and steam treating chambers, in which chambers the oil is treated with steam under vacuum conditions. For example, glyceride oils heated to 540° to 600° F. can be quickly cooled in the absence of steam to about 400° to 450° F., subjected to effective steam distillation under vacuum conditions, again quickly cooled in the absence of steam, again given a steam distillation treatment, etc. The first steam distillation treatment should not be substantially below 400° F. and the last steam distillation treatment should not be above 325° to 350° F., and should preferably be at a somewhat lower temperature.

The odor and taste due to this cracking or other action is rubbery in nature and may be called a "cooked" or hot oil flavor. It increases rapidly with the time during which the oil is held at elevated temperatures when out of intimate contact with steam. Even a few seconds time at temperatures in the neighborhood of 550° F. while the oil is flowing through a pipe to a cooler or the short delay in even a flash cooler before the oil temperature drops will cause an appreciable off flavor to be developed. However, if the oil is cooled from the final temperature reached in the last deodorizing stage to a temperature below approximately 350° F., in accordance with either of the procedures discussed above, the volatile materials causing the unpleasant odor and taste are withdrawn from the oil substantially as soon as they are formed. Even if the oil has been cooled to a relatively low temperature with no steam and vacuum treatment so that the cooked flavor has developed, it can be again reheated to a temperature between 400° and 450° F. and subjected to one of the steam and vacuum treatments discussed in the preceding paragraphs.

The reversion phenomenon is also encountered in connection with hydrogenated or hardened oils. In general, hydrogenated oils, when they are removed from the hydrogenating apparatus, have an odor and taste which is similar to the odor of a snuffed tallow candle, and in order to remove this odor and taste, so as to permit the use of the oil for edible purposes, all hydrogenated oils, subsequent to the hydrogenation operation, have been subjected to a deodorization process. Conventionally, a batch deodorization process, as described in the foregoing, has been used. The oil after removal from the deodorizer is usually substantially odorless and tasteless, but upon standing, an undesirable odor and taste may again develop, i. e. the oil reverts. The rate at which the undesirable odor and taste develops is accelerated at high temperatures, for example, temperatures of the order employed in frying or baking, but all soya bean oils and many other hydrogenated oils deodorized by prior processes revert at much lower temperatures.

It has been discovered, however, that subjecting glyceride oils which are to be subsequently hydrogenated to a steam distillation, heat treatment or conditioning, similar in certain respects to the initial portion of the deodorizing process of the present invention, will so condition the oil as to nullify the capabilities of the reversion-producing materials to cause objectionable odor and taste in the oil after hydrogenation. It is still necessary to deodorize the oil, after the conditioning treatment and subsequent hydrogenation, in order to remove the flavor developed during hydrogenation, but this deodorization may be a relatively mild treatment by the use of the batch process.

In the practice of this conditioning treatment, the refined oil is subjected to steam distillation desirably in a plurality of stages at progressively increasing temperatures, starting at a temperature in the neighborhood of 395° to 450° F., and ending with temperatures between 500 and 600° F., preferably between 525 and 575° F. During the oil conditioning process, a relatively small amount of steam is passed through the oil, for example, 0.03 to 0.01 pound of steam per pound of oil. Also, during the oil conditioning treatment, the oil is subjected to a vacuum within the range of from about ¾ to 3 mm., and preferably about 1.5 mm. of mercury absolute.

As in the deodorizing process of the invention, care is exercised not to heat any portion of the oil substantially above the average temperature in any part of the process during the entire conditioning operation. The oil is subjected to temperatures above about 400° F. for a period of not more than two hours, i. e. from one to two hours, and the time at the higher temperature is preferably from about 15 minutes to 30 minutes. After the steam distillation and heat treatment conditioning, and prior to hydrogenation, the oil can be cooled while being subjected to steam and vacuum. However, cooling under vacuum in the presence of steam is not essential to the attainment of a non-reverting hydrogenated oil. While the oil is hot, it is desirable that it be kept out of contact with air until it has reached a temperature below about 160° F. After hydrogenation, it is necessary, as above noted, to deodorize the oil.

Deodorizing processes involving continuous or stage operations have been suggested prior to this invention, but in general, such processes have attempted to duplicate the conditions in batch operations. Furthermore, it has not, heretofore, been possible to secure adequate contact between the oil and the steam employed in the deodorizing operations. So far as applicant is aware, these prior continuous or stage deodorizing operations have not consistently produced as good a quality of oil as the conventional batch operations and have not been employed commercially on a large scale.

In the present process, as above described, the oil is heated in steps or stages to a higher temperature than those found possible in prior commercial processes and the total time of heat treatment of the oil is very much shortened as compared with such prior processes. The more unstable, heat-sensitive volatile impurities are removed or modified at each stage in the process before the temperature of any portion of the oil is further increased. Overheating of any portion of the oil at any stage even in the rapid process is prevented by employing heating surfaces of large area relative to the amount of oil being heated and maintaining the average temperature differential between the heating surfaces and the oil being heated at a low value as compared to prior processes. The desired rapid removal or modification of the heat-sensitive odor and taste producing materials before reaching the high temperature is accomplished by maintaining the oil in a relatively shallow stream or pool during the treatment process, and by employing a high vacuum and insuring intimate and effective contact of steam with all of the oil in the distillation steps.

In addition to producing a highly stable deodorized oil, the present process removes substantial amounts of impurities from the oil by vaporization of those materials, and before they are deleteriously affected by high temperatures, recovers these materials as a very valuable product of the process. The vaporized materials are condensed in the vacuum system as an aid in maintaining the high vacuum contemplated in the process and are easily recovered as a concentrate containing large proportions of fat soluble vitamins as well as valuable sterols and analogous compounds. The recovered concentrate forms a marketable material as a source of vitamins, sterols, etc.

It is therefore an object of the present invention to provide an improved process of deodorizing oil by which soya bean and other glyceride oils can be converted into a substantially odorless and tasteless food material which is stable against reversion and which has its physical properties substantially unmodified.

Another object of the invention is to provide a deodorization process in which an edible glyceride oil is brought into intimate contact with steam under high vacuum in a series of stages with progressively rising temperatures in the various stages and with a higher temperature in the final stage than has heretofore been considered feasible, followed by cooling during treatment with steam under high vacuum.

Another object of the invention is to provide an improved deodorizing step wherein steam is brought into extremely intimate contact with the oil under vacuum conditions.

Another object of the invention is to provide an improved process of vaporizing or otherwise modifying impurities in glyceride oil wherein a high vacuum is maintained above a shallow pool of heated oil while steam is introduced into the lower portion of such pool and the oil is repeatedly brought into contact with the steam without being discharged from the treating chamber with the steam.

A further object of the invention is to provide a deodorization process in which the more volatile of the heat-sensitive materials causing odor and taste are removed from the oil or are modified prior to subjecting the oil to the higher temperatures employed to remove or modify less volatile impurities.

A further object of the invention is to provide an improved deodorizing process in which provision is made for rapidly heating the oil being deodorized to elevated temperatures without heating any portion of the oil in any portion of the process materially above the average temperature of the oil in such portion of the process.

A further object of the invention is to provide an improved process of recovering a valuable distillate fraction from glyceride oils.

A still further object of the invention is to provide an improved process of recovering unsaponifiables including vitamins, sterols, etc., in concentrated form from a glyceride oil while at the same time producing an improved oil.

Further objects and advantages of the invention will appear in the following description of preferred embodiments thereof given in connection with the attached drawings, in which:

Figure 1 is a schematic diagram of an apparatus suitable for carrying out a continuous process in accordance with the present invention;

Figure 2 is a somewhat diagrammatic vertical section through the deodorizing chamber of Figure 1;

Figure 3 is a vertical section through the deodorizing chamber taken on the line 3—3 of Figure 2;

Figure 4 is a vertical cross-section through a preferred type of heat exchanger employed in the apparatus of Figure 1;

Figure 5 is a view similar to Figure 3 showing a modified deodorizing chamber;

Figure 6 is a fragmentary elevation of a finned heater tube of the deodorizing chamber of Figure 5;

Figure 7 is a diagrammatic view partly in vertical section of a modified deodorizing apparatus;

Figure 9 is a flow diagram of a process which may be carried out in the apparatus of Figure 1; and Figure 10 is a view similar to Figure 9 showing a modified process.

Figure 8:
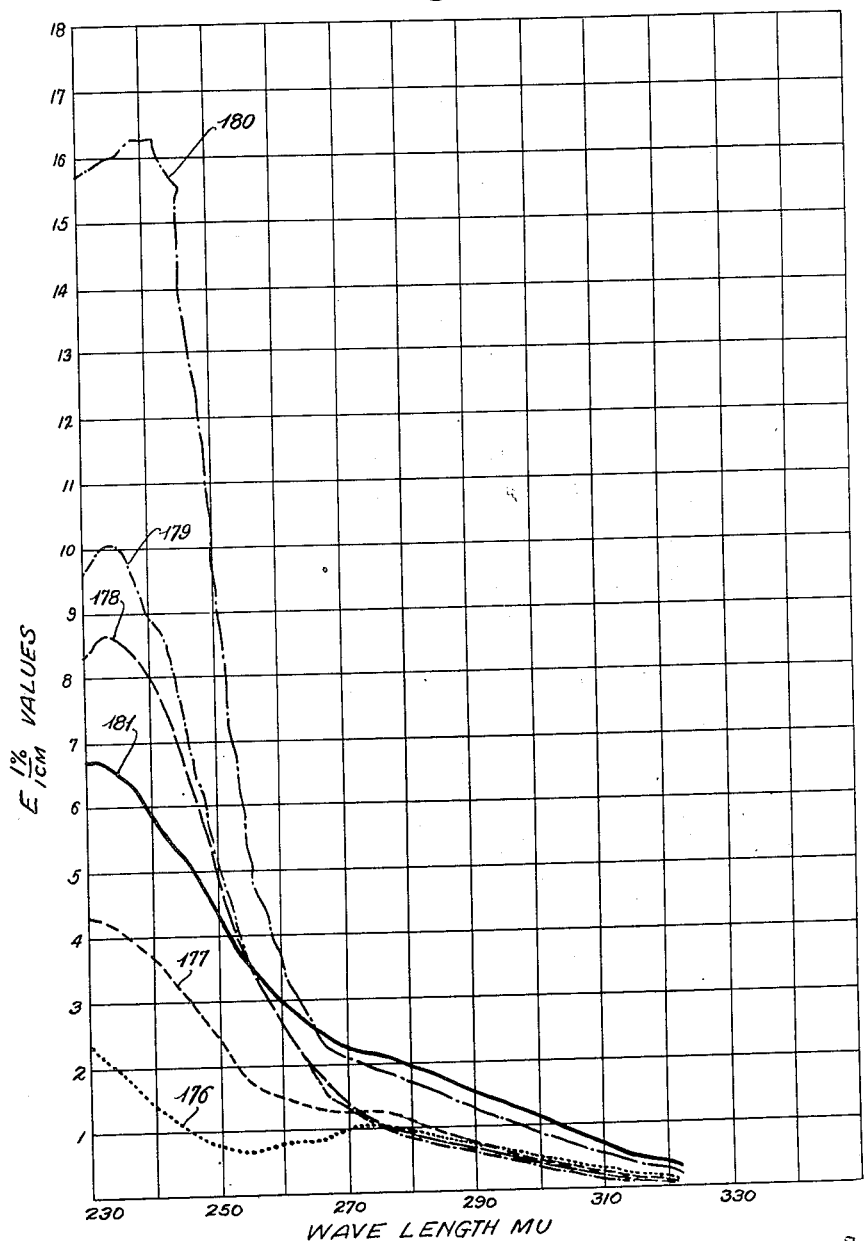
Figure 8 is a graph showing certain of the characteristics of the oil resulting from various types of deodorizing treatments.

Referring more particularly to the drawings, Figure 1 illustrates a complete apparatus for producing a finished oil from a once refined oil, for example, an alkali-refined oil. In this figure, 10 indicates a kettle employed for decolorizing oil entering the process; 11 indicates a storage tank for the decolorized oil; 12 indicates a constant-level tank for feeding oil to the deodorizing apparatus; 13 indicates in general the deodorizing apparatus including deodorizing chambers 14, 16 and 17, as well as the heat exchange devices 18, 19, 21 and 22; 23 indicates in general a vacuum apparatus including vacuum boosters or thermal compressors 24 and 26 and condensers 27, 28 and 29; 31 indicates in general a dewaxing apparatus including oil coolers 32 and 33 and dewaxing tanks 34 and 36, as well as filter press 37; while 38 indicates a separation tank for recovering the volatile materials vaporized from the oil in the deodorizing apparatus and condensed along with water in the condensing apparatus 23.

The oil enters the process through a pipe 39 and if it requires decolorizing, it may be introduced directly into the decolorizing kettle 10 through pipe 41. The decolorizing kettle 10 may be of the conventional type employed in oil processing and may include a steam coil 42 for heating the oil in the kettle 10 and an agitator 43 driven from any suitable source of power. The oil may be suitably treated with adsorbents in the kettle 10 at moderately elevated temperatures and removed therefrom by a pump 44 and forced through a filter press 45 to the storage tank 11. If the incoming oil does not require decolorizing, it may be directly delivered through the pipe 46 to the storage tank 11. Decolorized oil may be withdrawn from the storage tank 11 through a pipe 47 having a float-controlled valve 48 therein and delivered into the constant-level tank 12. The constant-level tank 12 may have a float valve chamber 49 connected to its upper and lower portions and containing a float 51 actuating the valve 48 through a linkage system including the link 52 and crank arms 53 and 54. A high vacuum is maintained in the constant-level tank 12 by a pipe 56 connected to the vacuum system later described. Low pressure in the tank 12 causes oil to flow from the storage tank 11 through a pipe 47 and valve 48 into the constant-level tank 12 under control of the float 51 to maintain a constant level of oil in the tank 12. The tank 11 and the tank 12 are ordinarily positioned a substantial distance above the deodorizing apparatus 13, and as the same vacuum is maintained in the tank 12 as is maintained in the deodorizing system, oil will flow by gravity from the tank 12 through the deodorizing system with a substantially constant gravity head.

Oil flows from the tank 12 through a pipe 57 and then through the outer tube of the heat exchanger 18 which is preferably of the finned tube type, later described in more detail. The incoming oil in the heat exchanges 18 is brought into indirect heat exchange with heated oil leaving the deodorizing apparatus to reduce the temperature of the latter-mentioned oil and to heat the incoming oil. The partially heated incoming oil leaves the heat exchanger 18 through a pipe 59 and flows through the heater 19 which is preferably of the same type as the heat exchanger 18. The incoming oil is brought into indirect heat exchange with a suitable heating medium such as steam in the heater 19 and is discharged through a pipe 62, forming the inlet to the deodorizing chamber 14. The deodorizing chambers 14, 16 and 17 are identical so far as their internal structure is concerned, and only one will be described in detail. The structure of the deodorizing chamber 14 is more clearly shown in Figures 2 and 3 and may include a horizontally extending cylindrical casing 63 provided with a plurality of vapor draw-off ducts 64, a pipe 66 extending along the lower portion thereof for introducing steam into the body of oil in the casing 63, and a baffle 67, which preferably comprises a screen, is positioned somewhat below the axis of the casing 63. The heated oil enters the deodorizing chamber through the pipe 62, preferably just below the level of the oil in the chamber, this level being maintained a short distance below the lower surface of the screen 67 in the absence of steam entering through pipe 66. The pipe 66 is preferably removable for cleaning and replacement and is provided with a plurality of small apertures 68 preferably directed downwardly, as illustrated in Figure 3. Steam escaping from the apertures 68 passes upwardly through the body of oil in the deodorizing chamber, carrying the oil upwardly through the screen 67, as is discussed in more detail below. A baffle 68', suitably supported from the upper portion of the casing 63 may be provided adjacent each vapor duct 64, to assist in preventing entrainment of liquid oil in vapors being withdrawn from the vaporizing chamber. The casing 63 of the vaporizing chamber is preferably provided with a removable manhole cover 69 and a removable closure member 71 is preferably provided to enable the screen 67 to be removed from the casing 63 for cleaning or replacement. The screen 67 is preferably provided with longitudinal stiffening members 72 along the sides thereof engaging in guides 73 which may be integral with or welded to the casing 63. The thickness of the screen 67, as well as the size and spacing of the perforations therein has been greatly exaggerated in Figures 2 and 3 for clarity of disclosure, but in general, the screen 67 will be made up of a thin plate of sheet metal having a large number of small holes therethrough, these holes in general ranging from 0.02" to 0.03" in diameter and occupying between 20% and 40% of the area of the screen. For most oils the diameter of the holes in the screen is preferably about 0.031" and the holes occupy approximately 25% of the area of the screen. The apertures 68 in pipe 66 are also small in diameter and are spaced along the length of the pipe, for example, these apertures may be approximately 0.031" in diameter spaced approximately 5 inches apart, although the diameter may vary between approximately 0.01 to 0.05 inch and the spacing may vary from approximately ¾" to 10 inches.

Referring again to Figure 1, partially deodorized oil from the chamber 14 leaves this chamber through a pipe 76 connected to a pipe 77, the pipe 76 being connected to the lower portion of the casing and also to an upper portion thereof to provide a vent to the space above the oil in the chamber. The pipe 77 is connected to the pipe 76 at the desired level of the oil in the chamber, thus retaining the oil in the chamber at this level. The oil is discharged from the chamber 14 through the pipe 77, passes through the outer tube of the heater 21 in indirect heat exchange with a suitable heating medium and enters the second deodorizing chamber 16 through a pipe 62 which may be entirely similar to the pipe 62 supplying oil to the deodorizing chamber 14. The treated oil from the chamber 16 is discharged through a pipe 76 and 77 in the same maner as the oil is discharged from the chamber 14 and flows through the outer tube of the heater 22 in indirect heat exchange with a suitable heating medium. The oil from the heater 22 enters the deodorizing chamber 17, through a pipe 62, similar to the pipes 62 of the deodorizing chambers 14 and 16.

In the particular apparatus shown which closely follows an actual full sized commercial installation, no space was available immediately adjacent the deodorizing chamber 17 for the installation of a cooling and steam treating apparatus and it was necessary to pump the treated oil for a considerable distance and to a different level. In order to maintain a constant level in the deodorizing chamber 17, the oil is discharged therefrom through a constant level system. A discharge pipe 78 connected to a pump 79 is employed to withdraw oil from the deodorizing chamber 17. The pump 79 discharges into a pipe 81, a portion of this oil flowing to the right in Figure 1 in the pipe 81 and dividing between bypass 82 having a manually adjustable valve therein and a bypass 83 having a float-controlled valve 84 therein. The oil passing through the bypasses 82 and 83 is returned to the deodorizing chamber 17 through a pipe 85. A float chamber 86 is connected to the deodorizing chamber at both its upper and lower portions and contains a float valve 87 actuating the valve 84 through a linkage mechanism including a link 88 and crank arms 89 and 91. The remainder of the oil discharged from the pump 79 flows to the left in the pipe 81 of Figure 1. The amount of oil thus discharged to the left through pipe 81 is on the average equal to the oil entering the process less any impurities removed in the process. A considerably greater amount of oil is however handled by the pump 79 in order to provide sufficient excess oil for proper operation of the level control apparatus. If the head against which the oil must be pumped to the left in pipe 81 is not sufficiently great to cause return of the oil through the bypasses 82 and 83, a manually adjustable valve 92 may be placed in the pipe 81 to the left of the pump 79 to adjustably restrict flow of oil. The float controlled valve 84 is moved toward its open position by the float 87 as the level in the deodorizing chamber drops and is moved towards its closed position as the oil level rises. It will be seen that the oil withdrawal system for the deodorizing chamber 17 may be adjusted to maintain a substantially constant oil level in the deodorizing chamber 17.

Although immediate cooling of the heated oil and continued steam treatment under high vacuum in another chamber of the same type as the deodorizing chambers 14, 16 and 17, is the preferred operation, space limitations in a particular installation required the use of vertical chambers. These chambers were arranged for various alternative operations. If further time of treatment at the high temperature to further deodorize the oil or to recover additional volatile materials is desirable, the oil from the deodorizing chamber 17 can be pumped through another heater $92^a$ of the same type as the heaters 19, 21 and 22, to restore any heat lost by radiation from the deodorizing chamber 17 or during flow from the chamber 17. In such an operation, the oil may be heated in the heater $92^a$ to approximately 550° F. and then introduced into the chamber $92^b$. If desired, steam may be introduced into the oil entering the heater $92^a$ by means of the pipe $92^c$. Steam is injected into the lower portion of the treating chamber $92^b$ through a distributor $92^d$. The chamber $92^b$ is provided with a screen $92^e$ positioned just above the oil level therein, in the absence of steam injection, and a high vacuum is maintained above the screen so that the action of the steam is to establish a circulation of oil through the screen and cause intimate contact of the steam with the oil in a manner similar to the action in the deodorizing chambers 14, 16 and 17. After further treatment in the chamber $92^b$ the treated oil at the high temperature is immediately delivered through a pipe $92^f$ into a cooling chamber $92^g$ which may be entirely similar to the chamber $92^b$ and be provided with a steam distributor $92^d$ and a screen $92^e$.

In the chamber $92^g$ the oil may be cooled to a temperature below approximately 325° and 350° F. while under a high vacuum and while in intimate contact with steam. This prevents any development of the cooked flavor. The chamber $92^g$ is provided with a cooling jacket $92^h$ or equivalent cooling apparatus through which any desired cooling medium such as water may be circulated. The chamber $92^b$ may likewise be provided with a heat exchange jacket $92^h$ which may be employed, if desired, to supply additional heat to the oil in the chamber $92^b$. If no further treatment with steam at temperatures of approximately 550° F. is desired, the heater $92^a$ can be by-passed and the chamber $92^b$ can be employed for cooling under high vacuum and in intimate contact with steam, in which case the chamber $92^g$ can be bypassed or both the chambers $92^b$ and $92^g$ can be employed for cooling. If the oil has been cooled in the absence of steam and vacuum so that a cooked flavor has been developed, the heater $92^a$ can be employed to again heat the oil which may then be cooled in the chamber $92^b$ or both chambers $92^b$ and $92^g$ under high vacuum and in intimate contact with steam to remove the cooked flavor.

The cooled oil leaving the treating chamber $92^b$ or $92^g$ has a suitable temperature for employment as a heating medium in the heat exchanger 18 and may be delivered thereto by a pump $92^i$. The pump $92^i$ and chambers $92^b$ and $92^g$ will ordinarily be provided with a constant level system (not shown) similar to that shown for removing oil from the deodorizing chamber 17 but such constant level system has been omitted from the drawing to avoid further complicating the drawing.

The cooled oil delivered to the heat exchanger 18 by the pump $92^i$ may flow through the inner tubes of the heat exchanger 18 in indirect heat exchange with the incoming oil and may be discharged from the heat exchanger 18 through a pipe 93. This oil may be passed through the outer tubes of the cooler 32 in indirect heat exchange with a suitable cooling medium such as water and then through the outer tubes of another cooler 33 in indirect heat exchange with a colder cooling medium such as chilled brine. The cooled and deodorized oil from the cooler 33 may be alternately delivered into the dewaxing or filtering kettles 34 and 36 through manually controlled valves 94 and 96 in the pipes 97 and 98, respectively. For example, the chilled oil may be delivered into the kettle 36 until a desired level of oil is obtained therein. While the oil is being treated in the dewaxing or filtering kettle 36, the kettle 34 may be filled by closing the valve 96 and opening the valve 94. Even if the oil is not given a dewaxing treatment it should be cooled to below approximately 160° F. before being exposed to the atmosphere. In most cases with soya bean oil it has been found that most of the waxes are removed as distillates such that brine chilling for dewaxing is unnecessary. The kettles 34 and 36 can then be employed for mixing filter aid with the oil at approximately ambient temperatures for removal of any suspended foreign materials.

Each of the dewaxing kettles 34 and 36 may include an agitator 99 driven from any suitable source of power. After one of the kettles has been filled, a filter aid such as diatomaceous earth or other finely divided adsorbent material, may be added to the oil and thoroughly admixed therewith by the agitator 99. The resulting mixture may be withdrawn from the kettles, for example the kettle 36, by a pump 101 through pipe 103 provided with a valve 104. This oil may be pumped through the filter press 37 and discharged from the process as finished oil. Alternatively, the oil may be withdrawn from the kettle 34 through a pipe 106 having a valve 107 therein and likewise passed through the filter press 37 while the kettle 36 is being filled and the oil therein admixed with the filter aid.

Since the heaters 19, 21 and 22 progressively raise the temperature of the oil, it is possible to pass a single heating medium in countercurrent flow through all of these heaters. Superheated steam at a moderate pressure, for example a pressure of 100 to 150 lbs. per square inch, is a suitable heating medium and such steam may be introduced into the inner tubes of the heater 22, for example, at a temperature of 670° F. through a pipe 108 so as to flow countercurrent to the oil being heated in the heater. The partly cooled steam may be discharged through the pipe 109, which pipe may form the inlet for steam to the heater 21. The further cooled steam may be discharged from this heater through a pipe 111 which in turn forms the inlet for steam to the heater 19. The spent or cooled steam may be discharged from the heater 19 through a pipe 112.

It will be understood that additional steam of proper temperature may be supplied to either of the heaters 19 or 21 or a portion of the steam from the previous heaters bypassed by connection (not shown), in order to heat the oil to the desired temperature in either of the heaters 19 and 21. In any event, all of the heaters 19 to 22, inclusive, are provided with heating areas in contact with the oil which are several times that which is usually considered necessary in heat exchangers. This large heating area enables the temperature of the heating medium employed to be reduced in order to reduce the temperature of the heated surfaces in contact with the oil. Also, the heating medium passed through the heaters is maintained in countercurrent flow with respect to the oil being heated and at the lowest possible temperature capable of economically imparting the necessary heat to the oil. The heating medium entering any of the heaters 19, 21 and 22 will preferably have a temperature which at no time is greater than approximately 100° F. above the temperature of the oil being discharged from such heater, although in some instances a somewhat higher temperature differential is permissive in the lower temperature stages. This is also true of the heat exchanger 18 as the heated oil forming the heating medium therein is partially cooled in one or both of the chambers 92$^b$ and 92$^g$ before entering the heat exchanger 18. In the case of the final heater 22, the heating medium entering the heater will ordinarily not have a temperature differential greater than approximately 50° F. above the oil discharged from the heater. The large heating area in the heaters in conjunction with the low temperature differential maintained between the heating medium and the oil, especially in the high temperature zones of the process, prevents heating any portion of the oil substantially above the average temperature of the oil at any given cross-section of the stream of oil flowing through the heaters.

Heaters or heat exchangers heretofore employed in heating glyceride oils for deodorizing have heretofore been designed on the basis of conventional heat exchange practice to give the maximum economical rate of heat transfer. The efficiency of such heaters is expressed as the coefficient of heat transfer which is the B. t. u. transmitted per square foot per hour per degree Fahrenheit difference in temperature between the heating medium and the liquid being heated. Prior heating arrangements for glyceride oils have been designed to provide coefficients of heat transfer as high as 250 to 500 and have employed heating mediums at the highest temperature available in order to use the smallest practical and therefore least expensive heating apparatus. This has inevitably resulted in heating the film of oil in contact with the heated surfaces to a temperature greatly above the average temperature of the oil. On the contrary, the present invention contemplates the employment of heaters or heat exchangers designed for a considerably lower coefficient of heat transfer, and with an average temperature difference between the oil and the heating medium which is preferably not greater than about 100° F.

Figure 4 is a fragmentary section through one of the passages of a heat exchanger of the type preferably employed in the heaters 19, 21 and 22, and the heat exchanger 18. The oil to be heated is preferably passed between the outer tube 112' and the inner tube 113, the heating medium, such as steam or heated oil, being passed through the inner tube 113. The inner tube 113 is preferably provided with a plurality of longitudinally extending fins 113' so as to provide an extremely large heating area in contact with the oil being heated. Furthermore, sufficient length of finned tube heating elements are preferably provided in each heat exchanger to furnish several times the heating area usually considered necessary for adequate heat exchange. The type of heat exchanger illustrated, or other suitable types providing an extremely large heating area, in conjunction with the use of a heating medium which has a relatively low difference in temperature with respect to the oil in any cross-section of the heat exchanger, enables the oil to be rapidly heated without overheating any portion thereof.

If desired, the oil may be kept in contact with steam even in the heaters 18, 19, 21 and 22 of Fig. 1 by introducing a small amount of steam into the stream of oil entering the heaters although successful operation of the process can be accomplished without such steam. The steam may be introduced through pipes 113$^a$ associated with each heater so as to direct small jets of steam in the direction of oil flow. The steam employed may be of the same character as that introduced into the deodorizing chambers, as discussed in detail below, and the amount of steam introduced into the oil entering each heater will ordinarily be a small fraction of that introduced into each deodorizing chamber through pipe 66. The steam introduced into the oil passing through the heaters is released in the deodorizing chambers and assists in separating vapors from the oil. Since the heater 19 is in series with the heat exchanger 18 any steam introduced into the oil passing through the heat exchanger 18 also passes into and through the heater 19 and in most cases all of the steam desirable in this part of the process will be introduced into the heat exchanger 18, although this amount of steam may be divided between the heat exchanger 18 and the heater 19. In general, the amount of steam thus introduced into each heater may be approximately ⅓ pound per hour or a total of approximately 1 pound per hour for all of the heaters on the basis of 3,000 pounds of oil passed through the system although this amount may vary from approximately ½ to 1½ pounds per hour. The steam introduced into the heaters produces turbulence of the oil flowing therethrough and substantially prevents the formation of a quiescent film of oil in contact with the heating surfaces. The possibility of overheating any portion of the oil may be thereby further minimized.

In order to eliminate any possibility of reverse flow of oil due to introduction of steam, as above described, the oil pipes entering the various heaters contain check valves 113b up stream from the steam jets provided by the pipes 113a. The steam jets also are of utility in cleaning the system when shutting down the process as they can be employed to blow residual oil out of the passages in the heaters and the pipes connecting the various elements of the apparatus. In this connection it is to be noted that in constructing the apparatus it is essential to avoid pockets or traps in any portion of the system through which the heated oil flows, not only to enable the system to be thoroughly cleaned, but to prevent any portions of the oil being trapped and subjected to high temperatures for extended periods of time.

If no heat is supplied to the deodorizing chambers 14, 16 and 17, a drop in temperature of the oil during its passage through such chambers will occur due to radiation of heat from the chambers even if they are heat insulated as effectively as practicable. This drop in temperature will range from approximately 10° F. in the initial lower temperature deodorizing chamber to approximately 30° F. in the highest temperature deodorizing chamber and the drop in temperature in the various chambers will vary with the ambient temperature. Although these drops in temperature do not prevent the carrying out of a successful deodorizing process in accordance with the present invention, a somewhat more accurate control of the temperatures in the process may be obtained if heat is supplied to the oil in the chambers at the same rate it is radiated from the chambers. This can be accomplished, as illustrated in Figs. 5 and 6, by placing a plurality of heating tubes 113c in the lower portion of the deodorizing chambers. The heating tubes 113c are preferably positioned to run longitudinally of the deodorizing chambers and are provided with a large number of fins 113e extending around the tubes and closely spaced longitudinally of the tubes. A heating medium such as steam can be passed through the tubes in controlled amounts to supply heat to the oil in the deodorizing chamber to compensate for heat lost by radiation from the chamber so that the temperature of the oil remains substantially constant during its passage through the chamber. Otherwise the deodorizing chambers may have the same construction as the chambers of Figs. 2 and 3 and corresponding parts have been given the same reference numerals.

As stated above, a high vacuum is maintained in the deodorizing chambers 14, 16 and 17 of Fig. 1. The absolute pressure in these chambers is preferably maintained not higher than approximately 1.5 mm. of mercury, the approximate range of pressure being between ¾ and 3 mm. The process of the present invention therefore requires an efficient vacuum and condensing system. Vapors are withdrawn from the deodorizing chambers through the large vapor ducts 64 communicating with the upper portion of the deodorizing chambers. The vapor ducts 64 of the vaporizing chamber discharge into an enlarged vapor conduit 114 which in turn connects with vertically extending vacuum manifold 115. Similar conduits 116 and 117 connect the vapor ducts 64 of the deodorizing chambers 16 and 17 with the vacuum manifold 115. Also, the duct 117a connects the upper portion of the chambers 92b and 92g with the vacuum manifold 115.

The vapors are withdrawn from the vacuum manifold 115 through a conduit 118 forming a part of the vacuum booster or thermal compressor 24. The vacuum booster 24 is a commercially available piece of apparatus, the details of which are not shown, having a Venturi passage in which a steam jet is directed axially of the Venturi passage toward the discharge end of the booster. Steam may be supplied to the vacuum booster 24 through a steam pipe 119 and the vacuum booster 24 delivers vapors and steam into the entrance of another vacuum booster 26, into which steam may be delivered by the pipe 121. While a single pair of vacuum boosters 24 and 26 are shown, it will be understood that as many pairs as are necessary may be provided to operate in parallel with the pair illustrated in order to handle the large volume of vapors from the deodorizing chambers.

The vacuum booster 26 discharges into the jet condenser 27 wherein the vapors are brought into direct contact with a jet of water supplied to the condenser 27 through a pipe 122. Any vapors which are not condensed in the condenser 27 are delivered into a second jet condenser 28 of smaller size into which water is delivered by the pipe 123 and any vapors remaining uncondensed in the condenser 28 are similarly delivered to a third jet condenser 29 into which water is introduced through the pipe 124. Any incondensable gases are withdrawn from the condenser 29 by means of a pair of jet ejectors 126 and 127 of relatively small size and connected in series. Steam may be introduced into the jet ejectors 126 and 127 through pipes 128 and 129, respectively. The discharge from the jet ejector 127 may be at atmospheric pressure through the pipe 131.

A barometric column can be employed for all of the condensers 27, 28 and 29 but in many cases sufficient vertical height is not available. In the latter case, water and condensed impurities from the oil may be withdrawn from the condenser 27 by a pump 132 through a pipe 133 and a constant liquid level may be maintained in the pipe 133 by means of a float-controlled valve 134 in the water pipe 136 supplying the water pipes 122, 123 and 124. The valve 134 may be actuated by a float 137 in a float chamber 138 having its upper portion connected to the interior of the condenser 27 and its lower portion connected to the pipe 133. Float 137 may actuate the valve 134 through a linkage system including a link 139 and crank arms 141 and 142. The float 137 actuates the valve 134 to increase the water supply to the condensers when the liquid level in the pipe decreases and conversely, to decrease the water supply, when the level in the pipe 133 increases.

Water and condensed materials may be discharged from the condenser 28 through pipe 143, which preferably forms a downwardly extending loop having an upwardly extending leg which connects with the interior of the condenser 27 so that liquids from the condenser 28 are discharged through the pipe 133 along with liquids from the condenser 27. These liquids contain a substantial amount of valuable products which are insoluble in water and lighter than water. The discharge from the pump 132 is, therefore, preferably delivered through a pipe 144 into the settling or separator tank 38. The lighter materials collect on the surface of the water in the tank 38 and are discharged from the tank through a pipe 146 into any suitable receiver 147. The water may overflow from the tank 38 through the pipe 148, suitable baffles 149 and 151 being provided in the tank 38 to separate the water from the lighter materials skimmed from the surface of the water.

Any materials condensed in the condenser 29 are relatively free of valuable products and may be discharged from the process through the pipe 152 which may be connected to any suitable apparatus (not shown) for preventing breaking of the vacuum in condenser 29, or alternatively, the pipe 152 may be connected to the pipe 133 so as to discharge the liquids from the condenser 29 to the separator tank 38.

Most of the free fatty acids and certain of the other easily vaporizable materials in the oil entering the process are volatilized in the first deodorizing chamber 14, and a substantial part of these volatile materials are condensed out of the vacuum system by placing a cooling jacket 153 around a portion of the vacuum conduit 114 leading from the deodorizing chamber 14. The condensed materials may be collected in an enlarged portion 154 of the conduit 114 and delivered by gravity through a pipe 156 to a tank 157. The tank 157 is maintained under vacuum and is vented back to the vacuum system through a pipe 158 connected to the vacuum manifold 115, to provide for free flow of liquids downwardly through the pipe 156. The condensed materials may be removed from the tank 157 from time to time, either by pumping against the vacuum into the separator tank 38 or by closing the valves 159 and 160 into the pipes 156 and 158, respectively, opening the valve 161 communicating with the atmosphere to thereby break the vacuum in the tank 157 and then allowing the condensed materials to flow from the tank through a pipe 162, having a valve 163 therein, into any suitable receiver.

The vacuum manifold 115 is also preferably provided with a cooling jacket 168 through which any suitable cooling medium may be circulated by means not shown and an additional amount of vaporized material, such as fatty acids and unsaponifiables, are condensed in the vacuum manifold 115. These condensed materials may be removed from the vacuum manifold 115 through a pipe 169 and collected in a closed trap 171. A pump as shown at 157 may also be employed to intermittently discharge these materials to the separating tank 38 through a pipe 172' or to any suitable receiver (not shown) through a pipe 173.

The vacuum boosters 24 and 26 will ordinarily be employed to increase the pressure on the vapors being discharged from the deodorizing chambers an amount equivalent to 1½ to 3 inches of mercury. That is to say, the velocity of the steam escaping from the steam jets in the vacuum boosters is converted into pressure in the diverging discharge portion of the Venturi passage. This means that the vapors from the deodorizing chambers, as well as the steam from the steam jets in the vacuum boosters, are condensed at a substantially higher absolute pressure than the pressure maintained in the deodorizing chambers, materially decreasing the load on the condensers and enabling the high vacuum discussed above to be maintained in the deodorizing chambers. In fact, it has been found that, if a sufficiently high vacuum be maintained in the vacuum system before the vacuum boosters are reached, a small amount of the water vapor in the entrance portion of the vacuum booster 24 will freeze into ice. It is therefore necessary to heat the entrance portion of the vacuum booster 24, for example by means of a heating jacket 174 through which any suitable heating medium, such as steam may be circulated.

In carrying out the process of Figure 1, the oil to be treated flows continuously through the deodorizing system. The decolorized oil in storage tank 11 will ordinarily be at ambient temperatures or not greatly above such temperatures. The oil is subjected to vacuum in the oil feed tank 12 so that this tank also functions as a deaerator to remove the greater portion of oxygen or other gases contained in the oil. These gases are delivered into the vacuum manifold 115 through the pipe 56 and pass through the condenser system and are eventually discharged from the vacuum system through the pipe 131. The deaerated oil flows by gravity through the outer tubes of the heat exchanger 18 and is therein heated to an average temperature in the neighborhood of 250° F. by indirect heat exchange with heated oil being discharged from the deodorizing portion of the system and entering the heat exchanger 18 at a temperature of approximately 325° to 350° F. The passage of the oil through this heat exchanger will ordinarily take in the neighborhood of 5 minutes and no portion of the oil is heated therein to a temperature substantially in excess of 350° F.

The principal features of the actual deodorizing steps of Figure 1 are also illustrated in flow diagram form in Fig. 9. The temperatures shown on Fig. 9 illustrate an actual specific example of the operation of a commercial plant during the deodorization of a soya bean oil, it being understood that the temperatures in the several deodorizing chambers, where the oil is maintained in a relatively shallow pool or stream, can be varied depending upon the oil being treated. The partially heated oil from heat exchanger 18 of Fig. 1 is passed through heater 19 and therein heated to a temperature ranging between 400° and 450° F. The temperature of the steam entering the heater 19 is desirably no greater than approximately 100° F. above the temperature of the oil leaving the heater and this temperature of the steam in conjunction with the countercurrent flow of steam relative to the oil and the temperature drop through the metal walls between the oil and the heating medium, prevent overheating of any portion of the oil. The heated oil is then discharged into the deodorizing chamber 14 and subjected to intimate contact with steam under an absolute pressure ranging between approximately ¾ and 3 mm. of mercury. In actual operation this pressure is usually held at about 1.5 mm. to 2 mm. of mercury. The oil level, in the absence of introduction of steam through the pipe 66, is preferably maintained approximately one inch below the screen 67 of Figs. 2 and 3 and the total depth of the oil in the deodorizing chamber under these conditions is preferably approximately 11 inches. Some variation in the depth of the oil body, as well as the distance of the oil level below the screen 67 is permissible, the oil depth ranging between approximately 10 and 20 inches in different sizes of deodorizing chambers, and the distance of the surface of oil below the screen in the absence of steam ranging between approximately ¾ to 1½ inches. It will be appreciated, however, that a body of oil having a depth within this range is a quite shallow body of oil when compared to the depth of oil employed in conventional treatment processes.

When steam is introduced into the lower portion of the shallow body of oil in the chamber 14 through the apertures 68 in the associated pipe 66, this steam carries a substantial portion of the oil in the form of bubbles up through the openings in the screen 67. In passing through the screen, the oil bubbles are subdivided into small bubbles comprising small portions of steam surrounded by an oil film. This produces intimate contact between the steam and the oil to allow the vaporizable materials to escape across the interface between the steam and the oil. Furthermore, the screen 67 prevents surging and splashing of the shallow pool of oil due to blowing steam therethrough. A body of foam made up of small bubbles collects on top of the screen 67 and these small bubbles constantly break to release steam and vaporized material, the oil released by reason of the breaking of the bubbles returning to the oil body below the screen through the apertures along the edge portion of the screen. The oil progresses gradually along the length of the deodorizing chamber from the inlet 62 to the outlet 76 and all of it is repeatedly carried upwardly through the screen so as to be repeatedly brought into intimate contact with the steam. It will be apparent that the action of the screen 67 is, in some respects, similar to the action of various known types of baffles, and while the accomplishment of all of the advantages of the invention requires the use of a screen, as shown, baffles may be employed in instances where the resultant decrease in operational efficiency is permissible. The baffles 68' adjacent the vapor outlet ducts 64 prevent any droplets of oil from being directly splashed into the outlets and furthermore, require the vapors to make an abrupt change of direction in entering the ducts 64 so as to largely eliminate entrainment of droplets of liquid oil in the vapors.

The oil discharged from the deodorizing chamber 14 is then raised to a higher temperature in the heater 21 and again treated with steam in the deodorizing chamber 16. The oil discharged from the deodorizing chamber 16 is heated to a still higher temperature in the heater 22 and again treated with steam in the deodorizing chamber 17. For most oils, the temperature of the oil entering the deodorizing chamber 16 ranges between 470° and 510° F., and the temperature of the oil entering the deodorizing chamber 17 preferably ranges between 540° F. and 600° F. For a soya bean oil the temperature of the oil entering the deodorizing chambers 14, 16 and 17 is preferably 440° F., 500° F., and 575° F., respectively.

If the deodorizing chambers 14, 16, and 17 are not provided with means for heating the oil in the chambers, there is a considerable loss of heat therefrom, even if they are efficiently heat-insulated. This means that the oil entering the deodorizing chambers must be heated somewhat above the average temperature of the oil therein. For example, the oil must be heated to a temperature of approximately 440° F. in the heater 19 to produce an average temperature of 435° F. in the deodorizing chamber 14. Similarly, the oil may be heated to approximately 500° F. in the heater 21 to maintain an average temperature of 490° F. in the deodorizing chamber 16 and may be heated to approximately 575° F. to maintian an average temperature of about 565° F. in the deodorizing chamber 17. These temperatures, higher than the average temperatures in the deodorizing chambers are, however, applied to the oil for such a short period of time that the oil is not damaged even in the higher temperature stage. It is apparent, however, that sufficient heat can be supplied to the deodorizing chambers to balance the heat lost by radiation by employing the finned heating tubes of Figs. 5 and 6 and that the temperatures reached in the various heaters could then be made the same as the average temperatures in the associated deodorizing chambers. The temperatures in the various deodorizing chambers of Figs. 1 and 7 may then range from approximately 395° to 450° F. in the chamber 14, from approximately 460° to 500° F. in chamber 16, and from approximately 540° to 580° F. in the chamber 17 although with certain oils it may be desirable to increase the temperature in the final stage to 590° or even 600° F., but in such cases the time of treatment in the high temperature stage will ordinarily be correspondingly shortened. That is to say, conjugation and polymerization as well as cracking of the glycerides in the high temperature stage increases with both time and temperature so that, in general, the higher the temperature the shorter the time of treatment and vice versa.

Although steam may be introduced into each of the deodorizing chambers 14, 16 and 17 at approximately the temperature of the oil therein, it has been found possible to employ steam at a temperature substantially lower than the temperature in the various chambers. The steam is introduced through the pipes 66 and may be saturated but steam with at least a small amount of superheat is preferred so as to avoid the possibility of droplets of water being introduced into the deodorizing chambers. Such droplets immediately flash into steam at the high temperatures and low absolute pressures employed and produce the equivalent of small explosions interfering with the uniform treatment of the oil with steam. Since the weight of steam required in each chamber in a given time is quite small, relative to the weight of oil passing through the chamber in the same time, the cooling effect of the steam results in a substantially negligible drop in the temperature of the oil in each chamber. For example, it has been found that 15 to 60 lbs. of steam per hour in each chamber, is adequate for treating approximately 3,000 lbs. of oil per hour, the steam being supplied at, for example, a pressure of 120 lbs. per square inch and at a temperature of 350° F. The temperature and pressure of the steam is not critical and the amount of steam may range between approximately 5 to 20 lbs. an hour in each chamber per 1,000 lbs. of oil an hour, that is, between approximately 0.005 and 0.02 lb. per lb. of oil. While steam is the preferred gas, it is apparent that any other gas inert to the oil may be employed.

For most oils, a treating time of approximately 20 to 30 minutes in each of the various deodorizing chambers is adequate. Thus in accordance with the specific example illustrated in Fig. 9, the oil can be heated from approximately 250° F.

to 440° F. in the heater 19 in approximately 5 minutes. It may remain in the deodorizing chamber 14 for approximately 20 minutes at an average temperature of approximately 435° F. It is then further heated in the heater 21 from approximately 428° F. to 500° F. in approximately 5 minutes and remains in the deodorizing chamber 16 for approximately 20 minutes at an average temperature of approximately 490° F. The oil discharged from the deodorizing chamber 16 is then further heated in the heater 22 from approximately 478° F. to 575° F. in approximately 5 minutes and remains in the deodorizing chamber at an average temperature of approximately 550° F. for approximately 20 minutes. The total time the oil is at a temperature above 400° F. in the deodorizing step is, therefore, approximately 1¼ hours but this time may be varied between approximately 1 and 2 hours, depending upon the nature of the oil, in which case the total time of treatment in the deodorizing chamber varies between approximately ¾ and 1½ hours, the time at the higher temperature varying between approximately 15 and 30 minutes.

In the specific example of Fig. 9, the oil at approximately 535° F. is delivered directly from the deodorizing chamber 17 into a cooling tank 92$^b$ where the oil is cooled to approximately 350° F. while steam is passed upwardly through the oil and while the oil is under a high vacuum. The oil remains in the tank 92$^b$ for approximately 20 minutes and is then delivered into the cooling tank 92$^g$ where it is cooled to approximately 325° F. while under a high vacuum and while being treated with steam. The time of treatment in the tank 92$^g$ is also approximately 20 minutes and the oil is then further cooled in the cooler or heat exchanger 18. Vertical cooling tanks are shown as space limitations in a particular plant required the use of such tanks but horizontal cooling tanks of the same structure shown in Figs. 5 and 6 are preferable as a more effective and more uniform treatment of the oil with steam can be accomplished therein.

In the deodorizing chambers 14, 16 and 17 the volatile materials are removed at progressively rising temperatures, the more volatile and more heat-sensitive materials being removed at the lower temperatures in the chamber 14, the somewhat less volatile materials being removed in the chamber 16, and the least volatile materials being distilled off in the chamber 17. As explained above, a slight amount of cracking of the glycerides apparently occurs at the temperatures employed in the chamber 17 but as long as the oil remains in contact with steam and under high vacuum the resulting decomposition products are removed as fast as they are formed. This cracking, however, continues during removal of the oil from the chamber 17 but the resulting decomposition products are removed during cooling in the tanks 92$^b$ and 92$^g$ to a temperature below that at which any further "cooked" or "hot oil" flavor develops. In the specific example of Fig. 9 the vacuum employed in all deodorizing chambers and cooling chambers was approximately 2.4 mm. of mercury absolute and the oil remained in each chamber for 20 minutes, i. e., 1 hour total time in the deodorizing chambers and 40 minutes in total time in the cooling chambers. Each chamber holds approximately 1000 lbs. of oil so that the throughput is approximately 3000 lbs. of oil per hour. The amount of steam introduced into each deodorizing chamber was .015 lb. per lb. of oil treated and the amount of steam introduced into each cooling chamber was .01 pound per pound of oil treated. Thus, the total amount of steam used to contact the oil in all three deodorizing chambers, and in the two cooling chambers, was .065 lb. per pound of oil treated.

The specific example illustrated in Fig. 10 employs the cooling procedure just described. In this specific example, four deodorizing chambers 175, 175$^a$, 175$^b$, and 175$^c$ are employed in conjunction with three steam treating chambers 175$^d$, 175$^e$, and 175$^f$. When treating a refined and conventionally bleached soya bean oil, the oil was introduced into deodorizing chamber 175 at a temperature of 435° F. and withdrawn at a temperature of approximately 428° F. to provide an average temperature of about 432° F. The oil was then heated to 460° F., passed through the deodorizing chamber 175$^a$ and withdrawn at a temperature of approximately 450° F. to provide an average temperature of approximately 455° F. in the deodorizing chamber 175$^a$. Similarly, the inlet temperatures of deodorizing chambers 175$^b$ and 175$^c$ was 500° F. and 545° F., respectively, and the outlet temperatures approximately 490° F. and 530° F., respectively, to provide average temperatures of approximately 495° F. and 538° F., respectively. The oil was then immediately cooled in stream flow from 530° F. to approximately 415° F. and introduced into the treating chamber 175$^d$ where it is treated with steam under vacuum conditions. It was then withdrawn, at a temperature of about 405° F. cooled to 400° F., and introduced into the chamber 175$^e$ and again treated with steam under vacuum conditions. Similarly, the oil withdrawn from chamber 175$^e$, at a temperature of about 390° F., was cooled to 325° F. and passed through chamber 175$^f$ where it was again treated with steam under vacuum conditions and then further cooled. The oil was withdrawn from chamber 175$^f$ at a temperature of about 318° F. and finally discharged from the system at 90° F.

Each of the chambers 175 to 175$^f$ may be of the same size and the same construction, i. e., that shown in Figs. 2 and 3. Each of the chambers may hold approximately 2500 lbs. of oil under operating conditions and the oil may remain in each of the chambers for approximately 20 minutes to provide a throughput of 7500 lbs. of oil per hour. The vacuum maintained in deodorizing chambers 175 to 175$^c$, inclusive, may be 1.9 mm. of mercury absolute. The vacuum maintained in the treating chambers 175$^d$ to 175$^f$, inclusive, during the cooling steps may, however, be 2.9 mm. of mercury absolute as this is sufficient to remove the "cooked" flavor at the temperatures employed.

It will be noted that the total time that the oil was maintained above a temperature of 400° F. was approximately 2 hours allowing 20 minutes in each of the deodorizing chambers and 5 minutes in each heater, and that the total time at a temperature above 540° F. was approximately 25 minutes. The amount of steam introduced into each deodorizing chamber was about .015 lb. per pound of oil treated and the amount of steam introduced into each treating chamber 175$^d$ to 175$^f$, inclusive, may be .0067 lb. per pound of oil treated, making a total of about .08 lb. of steam per pound of oil used to contact the oil in the entire process.

The total amount of steam employed to contact the oil in processes in accordance with the present invention will preferably range from approximately .03 to 0.1 lb. per pound of oil treated. In conventional batch operations the amount of steam employed to contact the oil is approximately 0.2 lb. per pound of oil treated or greater so that the present process requires ¼ to ½ that required in such batch operations. Also, although such batch operations do not, in general, employ as low an absolute pressure as that contemplated in the present invention, the amount of steam required to produce the vacuum employed in batch operations is usually several times that required to operate the vacuum producing means in the present process, because of the longer time of treatment necessary for conventional batch procedures and the lower steam ratio in the present process. It is to be noted that the steam employed in the present process to contact the oil functions as an inert gas so far as its action on the oil is concerned. Steam is employed because of the cheapness and the ease with which a vacuum may be maintained by condensing the steam but any other gas which is inert to the oil could be employed if the required vacuum producing equipment is likewise employed. For example, carbon dioxide can be used to contact the oil if absorbers for this gas are employed in the vacuum producing equipment.

In general, the vacuum in the deodorizing chambers can range from about ¾ mm. to about 3 mm. of mercury absolute, a vacuum of 1.5 mm. being preferred for commercial operations. The vacuum in the treating chambers during the cooling operation may be of the same order as described with respect to Fig. 9 but may be somewhat lower, for example, up to an absolute pressure of about 5 mm. of mercury absolute. With some oils it is even possible to operate with an absolute pressure as high as 5 mm. in the deodorizing chambers but best results are obtained with absolute pressures below 3 mm. of mercury. Also in general, the temperature in a first stage of a series of deodorizing stages of the present invention may range between approximately 395° F. and 450° F. and may range in the final stage between approximately 500° F. and 600° F., preferably 525° to 575° F., with one or more stages at intermediate temperatures. The oil should be cooled to a temperature below approximately 325° F. to 350° F. with steam treatment under vacuum conditions beginning at a temperature not lower than approximately 400° F. The total time the oil is above approximately 400° F. can range from approximately 1 to 2 hours with the time during which the oil is subjected to temperatures above approximately 500° F. can range from approximately 15 to 30 minutes, the shorter times in this range being employed with the higher temperatures and vice versa.

In both the specific examples of Figs. 9 and 10, all of the heating of the oil is illustrated as being in stream flow by indirect heat exchange externally of the deodorizing chambers. The deodorizing chambers may, however, be of the type shown in Figs. 5 and 6 in which finned tubes $113^c$ are positioned in the lower portions of the chambers and supplied with a heating medium. These heating tubes may be employed to furnish just enough heat to overcome radiation of heat from the chambers so that the temperature of the oil in each chamber remains substantially constant thus enabling the highest temperature to which the oil is subjected in the process to be somewhat lowered for the same deodorizing efficiency. Alternatively, it is possible to employ the heating tubes inside the deodorizing chambers to increase the temperature of the oil while in the deodorizing chambers thus removing a portion of the heating load from the heaters supplying oil to the deodorizing chambers. Also, such tubes may be employed to supply all of the heat imparted to the oil in the process, thus eliminating the heaters supplying heated oil to the deodorizing chambers. In an operation of this type, however, it is preferred to pre-heat the oil in an external flow heater to at least 250° F., the remainder of the heat being supplied in the deodorizing chambers. This type of operation enables the temperature of the oil to be gradually elevated to the desired highest temperature and in effect provides an unlimited number of stages. The action of the steam introduced into the lower portion of the oil pool causes the oil to rapidly circulate in paths parallel to the planes of fins $113^e$ which, in conjunction with the large heating area provided by the fins, causes exceptionally efficient heat exchange without overheating any portions of the oil. The fins $113^e$ also act as baffles to prevent short circuiting of any of the oil through the deodorizing chambers so that the oil is even more uniformly treated. It will be apparent that cooling of the oil may also be accomplished in chambers of the type shown in Figs. 5 and 6 by supplying a cooling medium to the tubes $113^c$ so that external coolers can also be eliminated in the process of Fig. 10 before each cooling and treating chamber.

The process of either Fig. 9 or 10, with or without the modifications just discussed, results in an oil which has an extremely bland odor and taste and which shows no tendency to revert to its objectionable, characteristic odor and taste, and compares favorably in its resistance to oxidative rancidity with the best oils previously produced.

Figure 8 shows a series of curves illustrating the effects of deodorizing treatment of glyceride oils at high temperatures and for various periods of time. A typical soya bean oil was selected and the data reported by the curves of this figure were obtained by investigation of the physical and chemical properties of the oil by means of the Beckmann spectrophotometer. In these curves, the E-values or specific absorption coefficients as determined by the spectrophotometer for various wave lengths of radiation in the ultra-violet spectrum are plotted against such wave lengths expressed in milli-microns. The E-value at any given wave length is the logarithm of the ratio of the intensity of the radiation transmitted through a column of a suitable solvent 1 cm. long to the intensity of radiation transmitted through the same length column of a one percent solution of the oil in the solvent. It is accepted that a definite peak or maximum at approximately 234 mu indicates conjugation of two double bond fatty acids, i. e., diene conjugation. Similarly, a definite peak or maximum at approximately 268 mu is accepted as indicating a conjugation of three double bond fatty acids, i. e., triene conjugation.

Curve 176 shows the E-values of an alkali-refined decolorized and undeodorized soya bean oil. This curve indicates that there was substantially no diene conjugation in the original oil although there may have been an appreciable amount of triene conjugation.

Curves 177, 178, 179 and 180 illustrate the effect on the oil of conditions closely simulating batch deodorizing under various conditions of time and temperature. The data for these curves was obtained from oil treated in the laboratory by elevating the temperature of the oil to the final temperature in approximately one hour and holding it at the final temperature for the remainder of the time. Curve 177 illustrates the effect on soya bean oil by heating to 400° F., the entire treating period being eight hours. This very closely simulates a batch deodorizing process at 400° F., and it will be noted that there is very little evidence of diene conjugation and substantially no increase in triene conjugation. Also polymerization of the oil was not excessive as determined by no significant fall in iodine value.

Curve 178 indicates treatment of the oil at 475° F. final temperature and a total treating time of six hours. The peak at 234 mu indicates a very definite increase in diene conjugation although there is substantially no evidence indicating triene conjugation. Also, polymerization had not occurred to a substantial extent as determined by iodine value. This curve does, however, indicate that the treatment at 475° F., for the time specified, has seriously changed the properties of the glycerides of the oil.

Curve 179 is the result of treatment of the oil at a final temperature of 550° F. Even though the time of total treatment has been shortened to one hour, as compared with six hours for curve 178 and eight hours for curve 177, the indicated diene conjugation is substantially increased, although excessive polymerization has not occurred as determined by iodine number.

Curve 180 shows the result of treatment at 550° F. for a total treating time of four hours. It will be noted that there is a peak at approximately 234 mu, and it was also determined that excessive polymerization had occurred as shown by a decrease in the iodine value and an increase in viscosity.

The oil in curve 181 was treated in accordance with the process of the present invention. This oil had its temperature raised in stages for a total treating time of one hour and the final temperature reached was 550° F. The oil was treated in stages under high vacuum conditions to remove the more volatile heat-sensitive materials prior to reaching the high temperature. It is noted that there is very little evidence of either diene or triene conjugation in the oil represented by curve 181. Also, polymerization was less than for the oil represented by curve 179, as determined by iodine values.

It will be observed from an examination of the curves shown in Fig. 8 that the 234 mu absorption or E-value increases as the time and temperature of treatment are increased. Thus, the E-value at 234 mu constitutes a convenient measure of the time and temperature reached during treatment in accordance with the process of the invention. The treatment can be continued for a period of time which is too great, or the temperature of treatment for a given period of time can be too high, and these conditions can be readily ascertained by determination of the 234 mu absorption at the completion of that treatment. Thus, the E-value at 234 mu constitutes a convenient measure for determining the point at which the deodorization process of the present invention should be terminated.

Tests indicate that a process involving times and temperatures which produce an E-value at 234 mu which is no greater than about 10 will yield a satisfactory, non-reverting oil for use as an unhardened oil. If the oil is to be subsequently hardened, i. e., hydrogenated, it is possible, and in some instances it may be desirable, to continue the treatment for a sufficient period of time, or at a sufficiently high temperature, to increase the 234 mu E-value to a maximum of approximately 11.5.

It is to be understood, however, that the mere increase of the E-value of a glyceride oil within the ranges stated above does not, of itself, produce a desirable product. It is only when the oil is treated by the process of the present invention, under conditions which produce E-values in the final oil, as above defined, that this value has any meaning or is usable as a measure of the quality of the oil.

As the E-value at 234 mu increases in the practice of the process of the present invention, it will be noted that there is an accompanying reduction in the tocopherol content of oils which contain those materials. Since the tocopherols are anti-oxidants, it may be found desirable at the completion of the deodorization process to add anti-oxidants, particularly when extended shelf-life is desired.

The oil represented by curve 177 was not adequately deodorized and quickly reverted. The oils represented by curves 178, 179 and 180 were substantially completely deodorized when removed from the deodorizer although such oils were not flavor stable. It should be apparent from the above discussion that large scale batch deodorization is not practical at temperatures above 500° F. as conjugation and polymerization become excessive.

Substantially the same processes described above with respect to Fig. 1 can, however, be carried out on a small scale as a batch operation and the data of curve 181 was obtained by such a small scale batch operation. A suitable apparatus for this purpose is shown in Fig. 7. In this figure, 182 indicates a small size batch deodorizing chamber holding, for example, 50 to 60 lbs. of oil. The chamber may be provided with a screen 183 somewhat below the center portion of the chamber and with a heating coil positioned in the lower portion of the chamber. The chamber is also preferably provided with external heating means, for example, electrical resistance heating units indicated at 186, surrounding the lower portion of the chamber. An inlet pipe 187, for steam, is shown as extending through the lower portion of the chamber, this pipe being provided with a perforated discharge member 188 for directing the steam into the lower portion of a body of oil contained in the chamber. The oil may be introduced into the chamber through a pipe 189 and deodorized oils withdrawn therefrom through a pipe 191.

Vapors may be withdrawn from the upper portion of the chamber through vapor duct 192 preferably having an upturned inlet portion to prevent oil from being splashed into the vapor duct 192 and the vapor duct 192 may communicate with an entrainment trap 193, preferably provided with a downwardly inclined baffle 194. Vapors may be withdrawn from the entrainment trap 193 through duct 196 which may communicate with the heated inlet of a vacuum booster such as the vacuum booster 24 of Fig. 1. The remainder of the vacuum condensing system may be the same as that shown in Fig. 1 and is therefore not illustrated in Fig. 7.

A drain tank 197 may be connected to the discharge pipe 191 from the deodorizing chamber 182 and the upper portion thereof may be vented back to the chamber through the pipe 198. The drain tank 197 is employed to rapidly drain oil from the deodorizing chamber 182 so that the deodorizing chamber may be again immediately filled and another batch deodorized. The oil may be rapidly cooled in deodorizing chamber 182 under vacuum conditions and while being treated with steam to a temperature below approximately 325° to 350° F. prior to draining by suitable cooling coils or jackets, for example, by flowing a cooling medium through the coil 184. If desired, further cooling to below approximately 120° F. may be performed in the drain tank 197 by providing this tank with a cooling jacket 199 through which any desired cooling medium may be circulated. By breaking the vacuum in drain tank 197, deodorized oil may be discharged from the drain tank through pipe 201, and if desired, delivered to a dewaxing step such as that carried out in the dewaxing tanks 34 and 36 of Fig. 1. In order to break the vacuum in the drain tank 197, the pipe 198 may be provided with a valve 202 and a branch pipe 203 provided with a valve 204 which may be connected to a source of inert gas, for example, a tank 206 containing carbon dioxide or nitrogen.

In carrying out the process in the apparatus of Fig. 7, a desired quantity of oil, usually at ambient temperatures or at moderately elevated temperatures, may be introduced into the deodorizing chamber 182. The amount of oil introduced will ordinarily be enough to bring the upper surfaces of the oil to approximately within an inch below the screen 183 after the oil has been heated to approximately 410° F. Steam is introduced through the pipe 187 and the oil heated in the chamber 182 as rapidly as possible without causing overheating of any portion of the oil to a temperature of 400° F. to 420° F. The oil is then maintained at this temperature under high vacuum conditions for approximately 5 minutes; the oil is again rapidly heated to a temperature of approximately 480° to 500° F., and again held at this temperature for approximately 5 minutes. The oil is then heated to a final temperature of approximately 540° to 580° F., and held at this temperature for approximately 5 minutes. The oil is then rapidly cooled and drained from the deodorizing chamber into the tank 199. During this entire time, steam is introduced through the pipe 187 through the perforated discharge member 188 and this steam carries oil up through the screen 183, in the same manner described at length with respect to the apparatus of Fig. 1.

The heating and treating cycle described above with respect to Fig. 1 may be followed as closely as possible in the deodorizing chamber 182. In general, the heating rate obtainable without overheating any portion of the oil is much lower than that in the apparatus of Fig. 1. It is, however, possible to continuously apply heat at a lower rate to gradually raise the temperature throughout the treating period. The total time of treatment during which the oil is at a temperature of 400° F. or above is preferably approximately one hour, but may range from approximately ¾ hour to 1½ hours, or even 2 hours in some cases, depending upon the nature of the oil being treated.

The limitation upon the size of the deodorizing chamber 182, i. e., the amount of oil treated therein, is primarily dependent upon the area of the heating surfaces which can be provided by the heating coil 184 and the heated inner surfaces of the lower portion of the chamber. Since the volume of the oil in the chamber in general increases much more rapidly than the heating area can be increased, as a practical matter, the apparatus of Fig. 7 is limited to a rather small size. Even so, it is, in general, impossible to produce as good results in the apparatus of Fig. 7 as in the apparatus of Fig. 1 even with a continuous heating cycle in the apparatus of Fig. 7. Rapid heating of the oil is an essential if the total time of treatment is to be made sufficiently short to prevent damage to the oil and at the same time this heating must be carried out so as not to raise the temperature of any particles of the oil substantially above the average temperature of the oil. Nevertheless, results similar to that shown by the curve 181 of Fig. 8 can be obtained in small sized apparatus of the type shown in Fig. 7.

The unsaponifiable content of a refined and decolorized soya bean oil will usually be in the neighborhood of 0.7% to 0.8%, the tocopherol content being approximately 0.15%. Prior deodorizing processes have reduced the unsaponifiable content to approximately 0.6% without substantial reduction of the tocopherol content, whereas the present process reduces the unsaponifiable content to 0.4% or 0.5% and the tocopherol content to 0.04% or less, even in some instances down to 0.01%. As disclosed in my copending application Serial No. 744,846, filed April 30, 1947, the unsaponifiable content may be as low as 0.2. The tocopherol content like the E-value at 234 mu is, in the final oil, an index of the effectiveness of the process, and the resistance of the oil to reversion. It is not definitely known that the tocopherol content of deodorized oil causes reversion, but it is apparent that the conditions in the present process effecting substantially complete removal of tocopherols also cause substantially complete removal or modification of substances producing reversion.

From the above description of the invention it is apparent that I have provided an improved deodorizing process which is capable of converting edible glyceride oils into high quality, substantially tasteless and odorless products which are extremely resistant to both reversion and rancidity, and that this applies even to the more difficultly treated oils such as soya bean oil. Factors contributing to this result are the high vacuum employed, the intensive treatment with steam, the substantially complete removal or modification of heat-sensitive volatile materials in the oil at relatively low temperatures and before they are subjected to higher temperatures employed in the process, the treatment of the oil in a final treatment stage at a high temperature for a short period of time and the prompt cooling of the oil from such high temperatures with treatment of the oil under high vacuum with steam.

In addition to producing an improved finished oil substantially free from odor and taste bodies and other volatile materials, the volatile materials removed from the oil are condensed and recovered as a concentrate. The concentrate constitutes a very valuable product. It contains sterols, tocopherols, and various other fat-soluble vitamins, depending upon the oil being treated, which may be separately recovered from the concentrate by known procedures, such as molecular distillation, or solvent treatment. The unsaponifiable concentrates recovered directly from the process of the present invention without further purification, except for removal of water, contain approximately 25% to 40% unsaponifiables including approximately 8% to 12% tocopherols in the case of soya bean oil and also substantial contents of various sterols. As also disclosed in my copending application Serial No. 744,846, the unsaponifiable content may be as high as 75% and the tocopherol content may be as high as 15%. Also, in the case of soya bean oil, the sterols are largely stigmasterol and sitosterol, both of which are valuable products, stigmasterol being employed in hormone manufacture. The concentrate may also contain a substantial amount of other fat-soluble vitamins, such as A and D, depending upon the oil being treated. The unsaponifiable concentrate of the present invention is thus a concentrated source of sterols, tocopherols and other vitamins, and since several hundred pounds of the concentrate are recovered for each tank car of oil treated, the value of the distillate fraction recovered constitutes one of the important advantages of the process. That is to say, under certain conditions the process can be operated at a substantial profit based on the sale of the distillate fraction alone, aside from the fact that an improved oil is produced. For this reason, among others, the high temperature process of the present invention is applicable to non-conjugated, glyceride oils in general even though the oils can be satisfactorily deodorized by prior processes. For example, corn oil contains a substantial amount of sitosterol, and the same is true of peanut oil. Rapeseed oil contains brassicasterol, and animal oils including fish oil and fish liver oils, in general, contain cholesterol, all of which are valuable products. Even in the case of paint and drying oils, the value of the distillate fraction makes treatment of these oils by the present process profitable and in addition, the quality of the oil is improved. For example, the process of the present invention removes the substances which cause yellowing in light colored enamels in which the treated oil is employed as a vehicle. Also, such oils as woolgrease containing a high percentage of cholesterol can be profitably treated by the present process for the purpose of recovering the sterol and other unsaponifiables. The process may then become primarily a process for the recovery of unsaponifiables from glyceride oils without damage to the oil or to the unsaponifiables.

As a specific example of a distillate fraction recovered directly from soya bean oil without further purification except for removal of water and containing approximately 30% unsaponifiables, the following table is given:

|  | Tank 157 | Trap 171 | Tank 147 | Total Distillate Fraction |
|---|---|---|---|---|
| Weight (lbs.) | 34.3 | 232.7 | 11.0 | 377.0 |
| Acid No | 44.3 | 33.7 | 50.7 | 39.6 |
| Total Unsaponifiables percent | 22.8 | 26.8 | 38.1 | 29.7 |
| Tocopherol do | 9.8 | 9.3 | 12.2 | 10.2 |
| Fatty acids do | 22.2 | 16.9 | 25.4 | 19.9 |
| Neutral Oil do | 57.5 | 57.5 | 28.4 | 49.1 |
| Moisture do | 0.9 | 1.2 | 9.4 | 3.6 |

The weight of the materials given in the above table represents the amount of distillate fractions collected from approximately 1 tank car of soya bean oil (60,000 lbs.), i. e., one-third of the material collected from a run in which three tank cars of oil were treated. It represents approximately minimum results as other runs have given considerably greater yields. A typical example of the total distillate fraction from a tank car of soya bean oil is as follows:

| | |
|---|---|
| Total distillate per car lbs | 500 |
| Acid No. | 40 |
| Total unsaponifiables per cent | 25–30 |
| Tocopherols do | 8 |
| Fatty acids do | 20 |
| Neutral oil do | 39–44 |
| Moisture do | 3 |

This application is a continuation-in-part of my copending application Serial No. 744,846, filed April 30, 1947, which in turn is a continuation-in-part of my copending application Serial No. 553,744, filed September 12, 1944. As disclosed in said application Serial No. 553,744, the temperatures and other conditions employed in the different zones of treatment may be widely variable depending upon various factors including the kinds of oil being treated, the periods of treatment, the number of zones or stages desired, etc. Thus the vacuum should be at least 28 inches of mercury and in a two-stage process the temperature in the first stage may be between 298° and 482° F., preferably not more than 455° F., and in the second stage the temperatures may be between 527° and 572° F. In an example of a three-stage process, the temperatures may be between 298 and 347° F., in the first stage; between 455 and 482° F. in the second stage and approximately 572° F. in the third stage.

I claim:

1. A rapid process for deodorizing a glyceride oil to produce an edible oil, which comprises, the steps of successively subjecting small quantities of said oil to a deodorizing treatment at progressively increasing temperatures, the final temperature being between approximately 500 and 600° F. while passing steam upwardly through said oil and withdrawing vapors and steam from above said oil at a sufficient rate to provide an absolute pressure at least as low as 5 mm. of mercury, restricting the time of treatment of the oil at said temperature to such a brief time as to prevent impairment of the edible properties of the glycerides of said oil, and condensing said vapors including said valuable by-products.

2. A rapid process for deodorizing a glyceride oil to produce an edible oil and for condensing valuable by-products vaporized from said oil, which comprises, the steps of successively subjecting small quantities of said oil to a deodorizing treatment at progressively increasing temperatures including passing upwardly through said oil a total amount of steam between approximately 0.03 and 0.1 lb. per pound of oil, withdrawing vapors and steam from above said oil at a sufficient rate to provide an absolute pressure at least as low as 3 mm. of mercury, restricting the time of deodorizing treatment of the oil to such a brief time as to prevent impairment of the edible properties of the glycerides of said oil, and condensing said vapors including said valuable by-products.

3. A rapid process for deodorizing a glyceride oil to produce an edible oil and for condensing valuable by-products vaporized from said oil, which comprises, the steps of successively subjecting small quantities of said oil to a deodorizing treatment at a temperature between approximately 500 and 600° F. while passing steam upwardly through said oil and withdrawing vapors and steam from above said oil at a sufficient rate to provide an absolute pressure at least as low as 3 mm. of mercury, restricting the time of treatment of the oil at said temperature to such a brief time as to prevent impairment of the edible properties of the glycerides of said oil, cooling said oil to a temperature below approximately 350° F. while continuing to pass steam through said oil, withdrawing vapors and steam from above said oil to maintain said vacuum, and condensing said vapors including said valuable by-products.

4. The process of producing a non-reverting, edible soyabean oil, which comprises the steps of, subjecting said oil in stream flow to a temperature between approximately 500 and 600° F. while passing steam through said oil and withdrawing steam and vapors from above said oil at a rate sufficient to maintain a vacuum providing an absolute pressure at least as low as 3 mm. of mercury to vaporize and remove tocopherol and other vaporizable constituents from said oil and thus produce a deodorized, non-reverting oil, obstructing the path of steam and oil carried upwardly from said oil by baffle structure having solid portions positioned above and adjacent the surface of said oil and provided with passagemeans therethrough, the horizontal extent of the solid portion of said baffle structure extending over and covering the greater portion of the area of the surface of said oil, whereby the baffle structure causes subdivision of the oil carried upwardly from the surface of said oil and causes contact between steam and oil and separation of steam and vapors from said oil, restricting the time of treatment of the oil at said temperature to such a brief time as to prevent damage to the glycerides of said oil, and condensing said vapors to recover a concentrate of said vaporizable constituents including said tocopherol.

5. A process as defined in claim 4, in which the oil is promptly cooled from said temperature to a temperature below a deodorizing temperature while continuing to pass steam through said oil.

6. A continuous process for producing an edible, non-reverting soyabean oil and recovering valuable by-products including tocopherol, which comprises the steps of, first subjecting said oil to an initial deodorizing treatment to vaporize the more volatile impurities therefrom and to condition said oil for a subsequent higher temperature deodorizing step without injury to the edible properties of the oil, subjecting the thus initially conditioned oil while in continuous flow to a temperature between approximately 500 and 600° F., restricting the time of said subsequent deodorizing step to a relatively few minutes to prevent injury to said oil, recovering and condensing the vaporized volatile materials including tocopherol as valuable by-products, said oil in said subsequent deodorizing step being subjected to steam treatment by passing steam upwardly through a shallow body of said oil, said steam and said vapors being removed from above said oil at a sufficient rate to maintain an absolute pressure not greater than approximately 3 mm. of mercury.

7. A rapid process for deodorizing a glyceride oil to produce an edible oil the steps which comprise, successively subjecting small quantities of said oil to a deodorizing treatment at progressive rising temperatures while passing steam through said oil in intimate contact therewith, said steam being distributed into the lower portion of said oil, withdrawing steam and vapors from above said oil at a sufficient rate to maintain a vacuum above said oil, baffling the path of said steam immediately above said oil to prevent splashing of said oil and entrainment in said steam, the amount of steam passed through said oil in said deodorizing treatment ranging between 0.03 and 0.1 lb. per pound of oil, and condensing the withdrawn steam and vapor.

8. The process of deodorizing a glyceride oil, which comprises, initially heating said oil to a temperature between approximately 395 and 450° F. to cause a substantial portion of the impurities causing odor and taste to be readily vaporized when steam is brought into intimate contact with the oil under high vacuum conditions, bringing steam into intimate contact with said oil at said temperature under said vacuum conditions to vaporize said portion of said impurities and separating the resulting vapors from said oil, progressively heating said oil to raise the temperature thereof and continuing to repeatedly bring steam into contact therewith under said vacuum conditions to remove additional amounts of said impurities from said oil, the final temperature being between approximately 500 and 600° F., thereafter cooling said oil to a temperature below 350° F. while continuing to bring steam into contact with said oil and maintaining said high vacuum conditions, the total time said oil is maintained above a temperature of 400° F. being between approximately ¾ and 2 hours, and the high vacuum conditions providing an absolute pressure not greater than 5 mm. of mercury.

9. The process as defined in claim 8, in which the total amount of steam brought into contact with said oil in said process is between approximately 0.03 and 0.1 lb. per pound of oil.

10. A continuous process of deodorizing oil, which comprises, continuously passing said oil in sequence through a plurality of deodorizing chambers, maintaining an elongated shallow body of oil at a deodorizing temperature in each of said chambers, causing said oil to progress along said body by continuously delivering a stream of oil into one end of said body and continuously withdrawing a stream of oil from the other end of said body, initially contacting said oil in each of said chambers with steam by discharging jets of steam into the lower portions of said bodies of oil, maintaining a high vacuum in each of said chambers to cause vaporization and removal of volatile materials from said oil, and heating said oil in stream flow prior to delivering it into each of said chambers to progressively increase the temperature of the oil in the process and cause the oil in each chamber to be at a higher temperature than in a preceding chamber.

11. A continuous process as defined in claim 10 in which the steam released into the lower portion of each of said bodies of oil carries oil upwardly through a plurality of apertures positioned just above the upper surface of said bodies of oil to insure thorough contact between the oil and said steam.

12. A rapid process for deodorizing a glyceride oil to produce an edible oil, which comprises, the steps of successively subjecting relatively small quantities of said oil to a deodorizing treatment at a deodorizing temperature, while passing steam upwardly through said oil and withdrawing vapors and steam from above said oil at a sufficient rate to provide a vacuum, restricting the time of treatment of said oil at said temperature such as to prevent impairment of the edible properties of said oil, and cooling said oil to a temperature below a deodorizing temperature while continuing to pass steam through said oil and while maintaining said vacuum.

13. A quick continuous process for deodorizing glyceride oils, which comprises, continuously passing said oil through a plurality of deodorizing stages at progressively increasing temperatures, intimately contacting said oil with steam in each of said stages while subjecting the oil to an absolute pressure at least as low as 5 mm. of mercury so as to vaporize and remove heat sensitive vaporizable impurities in a lower temperature stage of said process before they are subjected to a higher temperature employed in a later stage of said process, vaporizing and removing additional vaporizable impurities at said higher temperature in a later stage in said process, said oil being subjected to temperatures between approximately 298 and 455° F. in said lower temperature stage of said process and to a temperature between approximately 500 and 600° C. in a final stage, minimizing the time of treatment of the oil in said final stage to prevent damage to said oil by the temperature employed therein, promptly cooling the oil after said treatment in said final stage to produce an improved deodorized oil, and condensing and recovering said vaporized impurities.

14. A quick continuous process for deodorizing glyceride oils, which comprises, continuously passing said oil through a plurality of deodorizing stages at progressively increasing temperature, intimately contacting said oil with steam in each of said stages while subjecting the oil to an absolute pressure at least as low as 5 mm. of mercury so as to remove heat sensitive vaporizable impurities in a lower temperature stage of said process and before they are subjected to the higher temperature employed in a later stage of said process in which additional vaporizable impurities are vaporized and removed, said oil being subjected to temperatures between approximately 298 and 455° F. in said lower temperature stage of said process and to a temperature between approximately 500 and 600° F. in said final stage, restricting the time of treatment of said oil in said final stage to such a few minutes as to prevent damage to said oil by the temperature employed in said final stage, and promptly cooling the oil after said treatment in said final stage.

15. A quick continuous process for deodorizing glyceride oils, which comprises, continuously passing said oil through a plurality of deodorizing stages at progressively increasing temperature, intimately contacting said oil with steam in each of said stages while subjecting the oil to an absolute pressure at least as low as 5 mm. of mercury so as to remove heat sensitive vaporizable impurities in a lower temperature stage of said process and before they are subjected to the higher temperature employed in a later stage of said process in which additional vaporizable impurities are vaporized and removed, said oil being rapidly heated during confined stream flow before each of said stages and being subjected to temperatures between approximately 298 and 455° F. in said lower temperature stage of said process and to a temperature between approximately 500 and 600° F. in said final stage, restricting the time of treatment of said oil in said final stage to such a few minutes as to prevent damage to said oil by the temperature employed in said final stage, and promptly cooling the oil after said treatment in said final stage.

16. A quick continuous process for deodorizing glyceride oils to produce high quality deodorized oils and recover valuable products therefrom, which process comprises, continuously passing said oil through a plurality of deodorizing stages at progressively increasing temperatures, steam distilling vaporizable impurities from said oil in each of said stages by subjecting the oil therein to an absolute pressure at least as low as 5 mm. of mercury while intimately contacting the oil with steam to assist in vaporizing and removing volatile materials by the partial pressure effect and mechanical action of said steam so as to vaporize and remove heat-sensitive vaporizable impurities in a lower temperature stage before they are subjected to a higher temperature employed in a later stage in said process in which additional vaporizable impurities are vaporized and removed, rapidly heating said oil in confined stream flow before each of said stages and subjecting said oil to a temperature between approximately 298 and 455° F. in said lower temperature stage and to a temperature between approximately 500 and 600° F. in the final stage, restricting the time of treatment in said final stage to such a brief time as to prevent damage to said oil by the temperature employed in said final stage, promptly cooling the oil after said treatment in said final stage, and condensing and recovering said vaporized impurities as valuable products.

17. A high temperature, rapid process for the deodorization of glyceride oils to produce deodorized edible products, which comprises, subjecting relatively small quantities of a glyceride oil to a temperature in excess of 440° F. and sufficiently high to impair the edible qualities of said oil, passing steam through said oil and maintaining said oil under vacuum conditions, and limiting the time said oil is subjected to said temperature to such a relatively brief period as to prevent the impairment of the edible qualities of said oil.

18. The process as defined in claim 17 in which the oil subjected to said temperature is promptly cooled below said temperature at which said edible qualities of the oil would be impaired.

19. The process as defined in claim 18 in which the oil is cooled to a temperature below 350° F.

20. The process as defined in claim 17 in which the oil subjected to said temperature is promptly cooled while being treated under vacuum conditions and while passing steam through the oil.

21. The process as defined in claim 17 in which the oil subjected to said temperature is promptly cooled and steam is passed therethrough under vacuum conditions while the oil is at progressively lower temperatures.

22. The process as defined in claim 17 in which the oil is maintained in continuous movement through a treating zone while being subjected to said high temperature.

23. The process as defined in claim 17 in which the glyceride oil is soyabean oil and a non-reverting deodorized soyabean oil is produced.

24. The process as defined in claim 17 in which the oil subjected to said temperature is soyabean oil and is promptly cooled while being treated under vacuum conditions and while passing steam through the oil.

25. The process as defined in claim 17 in which the oil is soyabean oil and said temperature is between 500° and 600° F.

26. In a process for deodorizing glyceride oils to produce products having improved edible qualities, wherein such oils are subjected to a deodorizing temperature under vacuum conditions while steam is passed therethrough, the improvement which comprises, subjecting said oils in relatively small quantities to a deodorizing temperature for such a brief period of time as to minimize impairment of the edible qualities of said oils, employing fresh steam uncontaminated by previous contact with the oil being deodorized and promptly thereafter subjecting the thus treated oils to a cooling treatment to reduce the temperature of said oils.

27. A process for deodorizing an edible glyceride oil, which comprises, subjecting a small quantity of said oil to a deodorizing treatment including passing steam upwardly through said quantity of oil, removing steam and vapors from above said oil at a sufficient rate to maintain said oil under vacuum conditions, subjecting said oil, while under said vacuum conditions and during said passing of said steam, to a temperature sufficiently high to damage said oil by impairing the edible properties thereof, and preventing damage to said oil by restricting the time of treatment thereof at said temperature to such a brief period as to avoid impairment of the edible properties of said oil.

28. A rapid process for deodorizing a glyceride oil to produce an edible oil, which comprises the steps of subjecting small quantities of said oil to a deodorizing treatment at a temperature sufficiently high that an extended time of treatment at said temperature will impair the edible qualities of said oil, while passing steam through said oil and withdrawing steam and vapors from above said oil at a rate sufficient to maintain said oil under vacuum conditions, restricting the time of treatment of the oil at said temperature to such a brief period as to prevent impairment of the edible properties of said oil, cooling said oil to a lower temperature substantially below said first-mentioned temperature and continuing to pass steam through said oil and withdrawing vapors and steam from above said oil to maintain said vacuum conditions.

29. The process as defined in claim 28 in which said treatment at said high temperature imparts a deleterious cooked flavor to said oil and the time of treatment at said lower temperature is sufficient to remove said flavor.

30. A rapid process for deodorizing a glyceride oil to produce an edible oil, which comprises the steps of subjecting small quantities of said oil to a deodorizing treatment at a temperature above 475° F. and sufficiently high that an extended time of treatment at said temperature will impair the edible qualities of said oil, while passing steam through said oil and withdrawing steam and vapors from above said oil at a rate sufficient to maintain said oil under vacuum conditions, restricting the time of treatment of the oil at said temperature to such a brief period as to prevent impairment of the edible properties of said oil, cooling said oil to a temperature substantially below said first-mentioned temperature and continuing to pass steam through said oil and withdrawing vapors and steam from above said oil to maintain said vacuum conditions.

31. A method for producing a non-reverting deodorized edible oil from a glyceride oil which tends to revert in flavor after deodorization, which process comprises, subjecting a small quantity of said oil to a deodorizing treatment within a range of deodorizing temperatures which will not impair the edible qualities of said oil including passing steam upwardly through said quantity of said oil while said oil is at a temperature within said range and maintaining said oil under vacuum conditions, and during said deodorizing treatment subjecting said oil to a higher temperature sufficient to render said oil non-reverting, said last-mentioned temperature being sufficiently high that extended time of treatment will damage said oil by impairing the edible qualities, and preventing such damage by cooling said oil to a temperature within said range before the edible properties of said oil have been impaired.

32. A method for producing a non-reverting deodorized edible oil from a glyceride oil which tends to revert in flavor after deodorization, which process comprises, subjecting a small quantity of said oil to a deodorizing treatment within a range of deodorizing temperatures which will not impair the edible qualities of said oil including passing steam upwardly through said quantity of said oil while said oil is at a temperature within said range and maintaining said oil under vacuum conditions, and during said deodorizing treatment subjecting said oil to a higher temperature at which extended treatment would damage said oil by impairing the edible qualities, and restricting the time of treatment of said oil at said higher temperature to such a brief period as to prevent said damage to said oil by promptly cooling said oil to a temperature within said range and continuing to pass steam through said oil while said oil is under vacuum conditions.

33. The process as defined in claim 32 in which said treatment at said high temperature imparts a deleterious cooked flavor to said oil and the time of treatment after cooling said oil and at said temperature within said range is sufficient to remove said flavor.

34. The process of deodorizing an edible glyceride oil, which comprises, treating said oil in a series of successive stages, said treating in each of said stages including passing fresh steam uncontaminated by previous contact with the oil being deodorized upwardly through a shallow pool of oil while maintaining a vacuum above the oil, subjecting said oil to said treating in at least one of said stages while said oil is at a deodorizing temperature above 440° F. and subjecting said oil to said treating in at least the last of said stages while said oil is at a temperature below 350° F.

35. A rapid process for deodorizing a glyceride oil to produce a palatable oil, which comprises, the steps of subjecting small quantities of said oil to a deodorizing treatment while said oil is at a temperature sufficiently high to impair the edible qualities of said oil if maintained for a substantial period of time, including passing steam upwardly through said oil and withdrawing vapors and steam from above said oil at a sufficient rate to maintain a vacuum, restricting the time of treatment of the oil at said temperature to such a brief time as to prevent impairment of said edible qualities of said oil by promptly cooling said oil to a temperature below approximately 350° F. and continuing to pass steam through said oil and withdrawing vapors and steam from above said oil to maintain said vacuum while said oil is at said last-mentioned temperature.

36. A rapid process for deodorizing a glyceride oil to produce a palatable oil, which comprises, the steps of subjecting small quantities of said oil to a deodorizing treatment while said oil is at a temperature between 500° and 600° F., including passing steam upwardly through said oil and withdrawing vapors and steam from above said oil at a sufficient rate to maintain a vacuum, restricting the time of treatment of the oil at said temperature to such a brief time as to prevent impairment of said edible qualities of said oil by promptly cooling said oil to a temperature below approximately 350° F. and continuing to pass steam through said oil and withdrawing vapors and steam from above said oil to maintain said vacuum while said oil is at said last mentioned temperature.

37. The process of deodorizing a soya bean oil, which comprises, heating said oil to a temperature between approximately 395 and 450° F. and sufficient to vaporize a substantial portion of the volatile impurities in said oil under high vacuum conditions and in contact with steam but insufficent to deleteriously modify heat-sensitive impurities in said oil, contacting said oil at said temperature with said steam under sad vacuum conditions to vaporize and remove said heat-sensitive impurities and condition said oil for treatment at higher temperatures, progressively increasing the temperature of the conditioned oil above said first-mentioned temperature and continuing to contact said oil with said steam under said vacuum conditions to vaporize and remove additional amounts of said volatile impurities, the final temperature being sufficiently high to reduce the tocopherol content of said oil to below 0.04% and to produce a deodorized oil having increased stability against reversion.

38. The process of deodorizing a glyceride oil, which comprises, progressively raising the temperature of said oil through a deodorizing range of temperatures while avoiding substantial local overheating of any portion of said oil during said heating, repeatedly bringing steam into intimate contact with said oil while said oil is subjected to progressively increasing temperatures in said range and maintaining said oil under high vacuum conditions during said contact with steam to first vaporize and remove heat-sensitive volatile impurities at temperatures in the lower portion of said range and to thereafter vaporize and remove less volatile materials at higher temperatures in said range, said steam being brought into intimate contact with said oil by distributing said steam into the lower portion of a shallow body of heated oil and causing said steam to carry heated oil in the form of bubbles upwardly through a plurality of apertures positioned above the surface of said body of oil to subdivide said bubbles and form a layer of foam above said apertures in which the bubbles constantly break to release steam and vaporized material and to release oil which returns to said body of oil through said apertures for further contact with steam.

39. A continuous process of deodorizing oil which comprises continuously passing said oil in sequence through a plurality of deodorizing chambers, maintaining an elongated shallow body of oil in each of said chambers, causing said oil to progress along said body by continuously delivering a stream of oil into one end of said body and continuously withdrawing a stream of oil from the other end of said body, contacting said oil in each of said chambers with steam by discharging jets of steam into the lower portions of said bodies of oil, maintaining a high vacuum in each of said chambers to cause vaporization and removal of volatile materials from said oil, and heating said oil in stream flow prior to delivering it into each of said chambers to progressively increase the temperature of the oil in the process and cause the oil in each chamber to be at a higher temperature than in a preceding chamber.

40. A continuous process for producing an edible, non-reverting soyabean oil and recovering valuable by-products including tocopherol, which comprises, the steps of first subjecting said oil to an initial low temperature deodorizing treatment in which the oil is treated with steam while under vacuum conditions and at a deodorizing temperature to vaporize the more volatile impurities therefrom and to condition said oil for a subsequent drastic deodorizing step without injury to the edible properties thereof, subjecting the thus initially conditioned oil to said drastic deodorizing step at a higher deodorizing temperature sufficiently high to vaporize substantially all reversion producing volatile materials therefrom, restricting the time of said last deodorizing step to a relatively few minutes whereby to prevent injury to said oil, recovering and condensing said vaporized volatile materials including said tocopherol as valuable by-products, said oil in said last deodorization step being subjected to steam treatment by passing steam upwardly through a shallow body of said oil, said steam and said vapors being removed from above said oil at a rate sufficient to maintain a vacuum causing vaporization of tocopherol.

41. In a process of deodorizing fatty oils, the steps which comprise, passing steam upwardly through a shallow pool of said oil in a deodorizing chamber while said oil is at a deodorizing temperature and under vacuum conditions whereby said steam causes liquid oil to be carried upwardly from the upper surface of said pool, obstructing the path of steam and oil carried upwardly from the surface of said pool by baffle structure having solid portions positioned above and adjacent the surface of said pool and provided with passage means therethrough, the horizontal extent of the solid portions of said baffle structure extending over and covering the greater portion of the area of the surface of said pool, whereby the baffle structure causes subdivision of the oil carried upwardly from said pool and increased contact between the steam and oil and separation of steam and vapor from the oil, and withdrawing the separated steam and vapor from said chamber without further contact with oil being deodorized.

42. The process as defined in claim 41, in which the amount of steam passed through said pool is between approximately 0.005 and 0.02 lbs. per pound of oil treated in said pool.

43. In a process of deodorizing fatty oils, the steps which comprise, successively subjecting said oil to treatment with steam in a plurality of shallow pools by passing steam upwardly through the oil in said pools while said oil is maintained under vacuum conditions whereby said steam escaping from said pools carries liquid oil upwardly from said pool, the oil in at least certain of said pools being maintained at a deodorizing temperature, obstructing the path of steam and oil carried upwardly from said pools by baffle structure having solid portions positioned above and adjacent the surfaces of said pools and provided with passage means therethrough, the horizontal extent of the solid portions of said baffle structures extending over and covering the greater portion of the areas of the surfaces of said pools, whereby the baffle structures cause subdivision of the oil carried upwardly from the pools and increased contact between steam and oil and separation of steam and vapor from the oil and withdrawing the separated steam and vapors from above each of said pools without further contact with the oil being deodorized.

44. The process as defined in claim 41, in which the oil is subsequently cooled to a temperature below deodorizing temperature under vacuum conditions while steam is passed upwardly through a pool of said oil.

45. The process as defined in claim 43, in which the amount of steam passed through said oil in said process is between approximately 0.03 and 0.1 pound per pound of oil treated in said process.

46. A multi-stage deodorizing process for fatty oils, which comprises, treating said oil with steam at progressively increasing temperatures during the deodorizing operation by distributing steam into the lower portion of a shallow pool of oil, thereafter similarly treating said oil with steam at progressively lowering temperatures, and maintaining a vacuum above said oil during each of said steam treatments by withdrawing and condensing vapors and steam.

47. In a process of deodorizing glyceride oils in which the oil at an elevated temperature and under vacuum conditions is contacted with steam, the improvement which comprises, contacting said oil with steam by forming a shallow body of oil at said temperature and under said vacuum in a vaporizing chamber, distributing steam into the lower portion of said body whereby said steam causes liquid oil to be carried upwardly from the upper surface of said body, obstructing the path of steam and oil carried upwardly from said body by a baffle structure having solid portions positioned above and adjacent the surface of said body and provided with a plurality of small apertures extending therethrough, the horizontal extent of the solid portions of said baffle structure extending over and covering the greater portion of the area of the surface of said body, whereby the baffle structure causes subdivision of the oil carried upwardly from the body and steam and oil are forced upwardly through certain of said apertures to produce a layer of foam above said baffle structure which breaks to release steam and vapors from said oil, returning the oil which separates from said foam to said body of oil through other of said apertures for further contact with steam, and withdrawing the released steam and vapors from said vaporizing chamber without further contact with the oil being deodorized.

48. In a rapid process for deodorizing a glyceride oil to produce an edible oil, the steps which comprise, successively subjecting small quantities of said oil to a deodorizing treatment in a deodorizing chamber under vacuum conditions and at a deodorizing temperature while passing steam through said oil, said steam being distributed into the lower portion of said oil whereby said steam causes liquid oil to be carried upwardly from the upper surface of said oil, obstructing the path of steam and oil carried upwardly from said oil by baffle structure having solid portions positioned above and adjacent the surface of said oil and provided with passage means therethrough, the horizontal extent of the solid portions of said baffle structure extending over and covering the greater portion of the area of the surface of said oil, whereby the baffle structure causes subdivision of the oil carried upwardly from the oil and increased contact between steam and oil and separation of steam and vapor from the oil, and withdrawing steam and vapors from said chamber without further contact with oil being deodorized and at a sufficient rate to maintain said vacuum.

49. The process as defined in claim 26 in which the oil during said cooling treatment is subjected to vacuum conditions while steam is passed therethrough.

50. The process as defined in claim 26 in which the oil is deodorized in a plurality of successive stages in each of which fresh steam uncontaminated by previous contact with the oil is employed.

51. The process as defined in claim 26 in which the deodorizing temperature employed is sufficiently high to damage said oil by impairing the edible qualities thereof.

52. The process as defined in claim 51 in which the oil being deodorized is soybean oil.

53. In the art of deodorizing glyceride oil to produce edible products wherein the oil is treated by passing steam therethrough while the oil is at a deodorizing temperature and under vacuum conditions; the improvement which comprises cooling the treated oil by subjecting relatively small quantities thereof to progressively decreasing temperature conditions while said oil is maintained under vacuum conditions and while passing steam therethrough.

54. The process of deodorizing an edible glyceride oil, which comprises, treating said oil in a series of successive stages, said treating in each of said stages including passing fresh steam uncontaminated by previous contact with the oil being deodorized upwardly through a shallow pool of oil while maintaining a vacuum above the oil, whereby to utilize the steam to form a rising and agitated oil-steam mixture, subjecting said oil to said treating in at least one of said stages while said oil is at a deodorizing temperature above 440° F., obstructing the vertical movement of said agitated mixture by a baffle structure having surfaces distributed horizontally through the mixture and separated for the free passage of vapors and steam upwardly therethrough, and subjecting said oil to said treating by steam and vacuum in at least the last of said stages while said oil is at a temperature below 350° F.

BENJAMIN H. THURMAN.

REFERENCES CITED

The following references are of record in the file of this patent:

UNITED STATES PATENTS

| Number | Name | Date |
|---|---|---|
| 1,498,389 | LaBour | June 17, 1924 |
| 2,280,896 | Dean | Apr. 8, 1942 |
| 2,327,766 | Cawley | Aug. 24, 1943 |
| 2,351,832 | Neal | June 20, 1944 |
| 2,422,185 | Dean | June 17, 1947 |

FOREIGN PATENTS

| Number | Country | Date |
|---|---|---|
| 242,316 | Great Britain | Nov. 9, 1925 |
| 277,085 | Great Britain | Sept. 7, 1927 |